US010192329B2

(12) United States Patent
Suzuki et al.

(10) Patent No.: US 10,192,329 B2
(45) Date of Patent: Jan. 29, 2019

(54) ELECTRONIC DEVICE WHICH DISPLAYS AND OUTPUTS FUNCTION FORMULA DATA, DATA OUTPUT METHOD, AND COMPUTER READABLE MEDIUM

(71) Applicant: CASIO COMPUTER CO., LTD., Shibuya-ku, Tokyo (JP)

(72) Inventors: Miki Suzuki, Fuchu (JP); Hiroaki Yoshizawa, Ome (JP); Hiroshi Uejima, Akishima (JP); Manato Ono, Wako (JP); Saburo Kamitani, Kokubunji (JP); Akiko Muraki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/855,122

(22) Filed: Sep. 15, 2015

(65) Prior Publication Data

US 2016/0086362 A1   Mar. 24, 2016

(30) Foreign Application Priority Data

Sep. 19, 2014 (JP) ................ 2014-191868
Sep. 19, 2014 (JP) ................ 2014-191879

(Continued)

(51) Int. Cl.
*G06T 11/20* (2006.01)
*G06F 15/02* (2006.01)

(52) U.S. Cl.
CPC ............ *G06T 11/206* (2013.01); *G06F 15/02* (2013.01)

(58) Field of Classification Search
None
See application file for complete search history.

(56) References Cited

U.S. PATENT DOCUMENTS 4,764,120 A   8/1988   Griffin et al.
4,963,097 A   10/1990  Anju
(Continued)

FOREIGN PATENT DOCUMENTS

CN   102831163 A   12/2012
JP   H09128366 A   5/1997
(Continued)

OTHER PUBLICATIONS

Okano et al.—JP 2011-204003; of record in the IDS received Oct. 23, 2017—Machine translation.*

(Continued)

*Primary Examiner* — Edward Martello
(74) *Attorney, Agent, or Firm* — Holtz, Holtz & Volek PC

(57) ABSTRACT

According to an embodiment, an electronic device includes a processor. The processor is configured to perform: formula input process of inputting a plurality of pieces of formula data in association with respective formula numbers through a user operation; a formula setting process of setting formula data in the pieces of formula data input by the formula input process as an output target by the user operation; cited formula extraction process of extracting another formula data in the pieces of formula data when the formula data set by the formula setting process cites a formula number of the another formula data; and a data output process of outputting the set formula data with the extracted another formula data.

17 Claims, 16 Drawing Sheets

(30) Foreign Application Priority Data

| Nov. 21, 2014 | (JP) | 2014-236083 |
| Nov. 21, 2014 | (JP) | 2014-236135 |
| Nov. 26, 2014 | (JP) | 2014-239295 |
| Nov. 26, 2014 | (JP) | 2014-239297 |
| Nov. 26, 2014 | (JP) | 2014-239325 |
| Nov. 26, 2014 | (JP) | 2014-239383 |
| Dec. 16, 2014 | (JP) | 2014-253833 |

(56) References Cited

U.S. PATENT DOCUMENTS

| 5,189,633 | A | * | 2/1993 | Bonadio | G06F 3/033 |
| | | | | | 708/142 |
| 6,302,698 | B1 | | 10/2001 | Ziv-El | |
| 6,750,864 | B1 | * | 6/2004 | Anwar | G06F 17/30489 |
| | | | | | 345/440 |
| 2002/0115050 | A1 | | 8/2002 | Roschelle et al. | |
| 2004/0072136 | A1 | | 4/2004 | Roschelle et al. | |
| 2005/0101314 | A1 | | 5/2005 | Levi | |
| 2006/0183100 | A1 | | 8/2006 | Voehl et al. | |
| 2007/0165860 | A1 | | 7/2007 | Handa et al. | |
| 2008/0003559 | A1 | | 1/2008 | Toyama et al. | |
| 2008/0104691 | A1 | | 5/2008 | Takeda et al. | |
| 2009/0066689 | A1 | * | 3/2009 | Yamaguchi et al. | |
| | | | | | G06T 1/0028 |
| | | | | | 345/418 |
| 2009/0254597 | A1 | | 10/2009 | Karoji | |
| 2010/0227304 | A1 | | 9/2010 | Horikawa et al. | |
| 2011/0254862 | A1 | * | 10/2011 | Okano | G06F 15/0225 |
| | | | | | 345/634 |
| 2012/0251997 | A1 | | 10/2012 | Kojo | |
| 2013/0026239 | A1 | | 1/2013 | Sakahashi et al. | |
| 2013/0050064 | A1 | | 2/2013 | Okano | |
| 2013/0209982 | A1 | | 8/2013 | Rooks et al. | |
| 2013/0309648 | A1 | | 11/2013 | Park et al. | |
| 2014/0009496 | A1 | | 1/2014 | Chapman et al. | |
| 2014/0342341 | A1 | | 11/2014 | Rea | |
| 2014/0356838 | A1 | | 12/2014 | Freimuth et al. | |
| 2016/0085716 | A1 | | 3/2016 | Yoshizawa et al. | |
| 2016/0085717 | A1 | | 3/2016 | Ono et al. | |
| 2016/0085845 | A1 | | 3/2016 | Yoshizawa | |
| 2016/0086512 | A1 | | 3/2016 | Yoshizawa | |
| 2016/0086513 | A1 | | 3/2016 | Uejima et al. | |

FOREIGN PATENT DOCUMENTS

| JP | 10171786 | A | 6/1998 |
| JP | 2004206405 | A | 7/2004 |
| JP | 2005322962 | A | 11/2005 |
| JP | 2006099256 | A | 4/2006 |
| JP | 2006125871 | A | 5/2006 |
| JP | 2006309619 | A | 11/2006 |
| JP | 2007304656 | A | 11/2007 |
| JP | 2009049948 | A | 3/2009 |
| JP | 2009053848 | A | 3/2009 |
| JP | 2009087047 | A | 4/2009 |
| JP | 2010129075 | A | 6/2010 |
| JP | 2010237999 | A | 10/2010 |
| JP | 2011076540 | A | 4/2011 |
| JP | 2011081301 | A | 4/2011 |
| JP | 2011097287 | A | 5/2011 |
| JP | 4720607 | B2 | 7/2011 |
| JP | 2011155534 | A | 8/2011 |
| JP | 2011204003 | A | 10/2011 |
| JP | 2012248013 | A | 12/2012 |
| JP | 2013025501 | A | 2/2013 |
| JP | 2013050746 | A | 3/2013 |
| JP | 2013073325 | A | 4/2013 |
| JP | 2013134740 | A | 7/2013 |
| JP | 2014023280 | A | 2/2014 |
| JP | 2014211836 | A | 11/2014 |
| WO | 2009107245 | A1 | 9/2009 |
| WO | 2012111559 | A1 | 8/2012 |

OTHER PUBLICATIONS

Okano—JP 2007-304656; of record in the IDS received Oct. 23, 2017—Machine translation.*

U.S. Appl. No. 14/855,084; First Named Inventor: Hiroaki Yoshizawa; Title: "Server Apparatus, Data Aggregation Method, and Communication Device"; filed Sep. 15, 2015.

U.S. Appl. No. 14/855,159; First Named Inventor: Hiroaki Yoshizawa; Title: "Server Apparatus, Method of Aggregating Calculation Target Data, and Storage Medium Storing Calculation Data Aggregation Program"; filed Sep. 15, 2015.

U.S. Appl. No. 14/855,921; First Named Inventor: Hiroaki Yoshizawa; Title: "Expression Processing Device, Compute Server and Recording Medium Having Expression Processing Program Recorded Thereon"; filed Sep. 16, 2015.

U.S. Appl. No. 14/856,031; First Named Inventor: Hiroshi Uejima; Title: "Server Apparatus, Data Integration Method and Electronic Device"; filed Sep. 16, 2015.

U.S. Appl. No. 14/856,478; First Named Inventor: Manato Ono; Title: "Calculator, Recording Medium and Compute Server"; filed Sep. 16, 2015.

Japanese Office Action (and English translation thereof) dated Jul. 5, 2016, issued in counterpart Japanese Application No. 2014-239295.

Japanese Office Action (and English translation thereof) dated May 10, 2016, issued in counterpart Japanese Application No. 2014-239383.

Japanese Office Action (and English translation thereof) dated May 17, 2016, issued in counterpart Japanese Application No. 2014-239325.

Togawa, et al., "Derive, Low-Price, Functionally-Rich Formula-Processing System Operating on MS-DOS", Nikkei Byte, Japan, Nikkei BP, Apr. 1, 1989, No. 57, pp. 265-269.

Watanabe, et al., "An Implementation of Graph Web Service and Its Application on Mathematical Education", Technical Research Report of the Institute of Electronics, Information and Communication Engineers, Japan, Jul. 18, 2005, vol. 105, No. 207, pp. 13-17.

Japanese Office Action (and English translation thereof) dated Jul. 4, 2017 issued in counterpart Japanese Application No. 2014-191879.

Japanese Office Action (and English translation thereof) drafted Jun. 6, 2017 in counterpart Japanese Application No. 2014-239297.

Japanese Office Action (and English translation thereof) dated May 30, 2017 issued in counterpart Japanese Application No. 2014-236135.

Japanese Office Action (and English translation thereof) dated May 30, 2017 issued in counterpart Japanese Application No. 2014-236083.

Japanese Office Action dated Oct. 10, 2017 issued in counterpart Japanese Application No. 2016-179499.

Ito, et al., "Emulation of Graph Calculator with Image Input—Mounting on Cellular Phone", FIT2007 (6th Forum of Information Technology), General lecture collected papers.

U.S. Office Action (Non-Final Rejection) dated Nov. 30, 2017 issued in related U.S. Appl. No. 14/855,159.

Japanese Office Action (and English translation thereof) dated Nov. 21, 2017, issued in related Japanese Application No. 2014-236083.

"Systems of Linear Equations", retrieved from internet: <https://www.bigideasmath.com/protected/content/ipe/grade/0208/02/g8_02_05.pdf>.

Japanese Office Action dated Mar. 13, 2018 issued in counterpart Japanese Application No. 2014-191868.

Japanese Office Action dated Jul. 10, 2018 (and English translation thereof) issued in counterpart Japanese Application No. 2017-145251.

Japanese Office Action dated Oct. 9, 2018 (and English translation thereof) issued in counterpart Japanese Application No. 2017-233588.

* cited by examiner

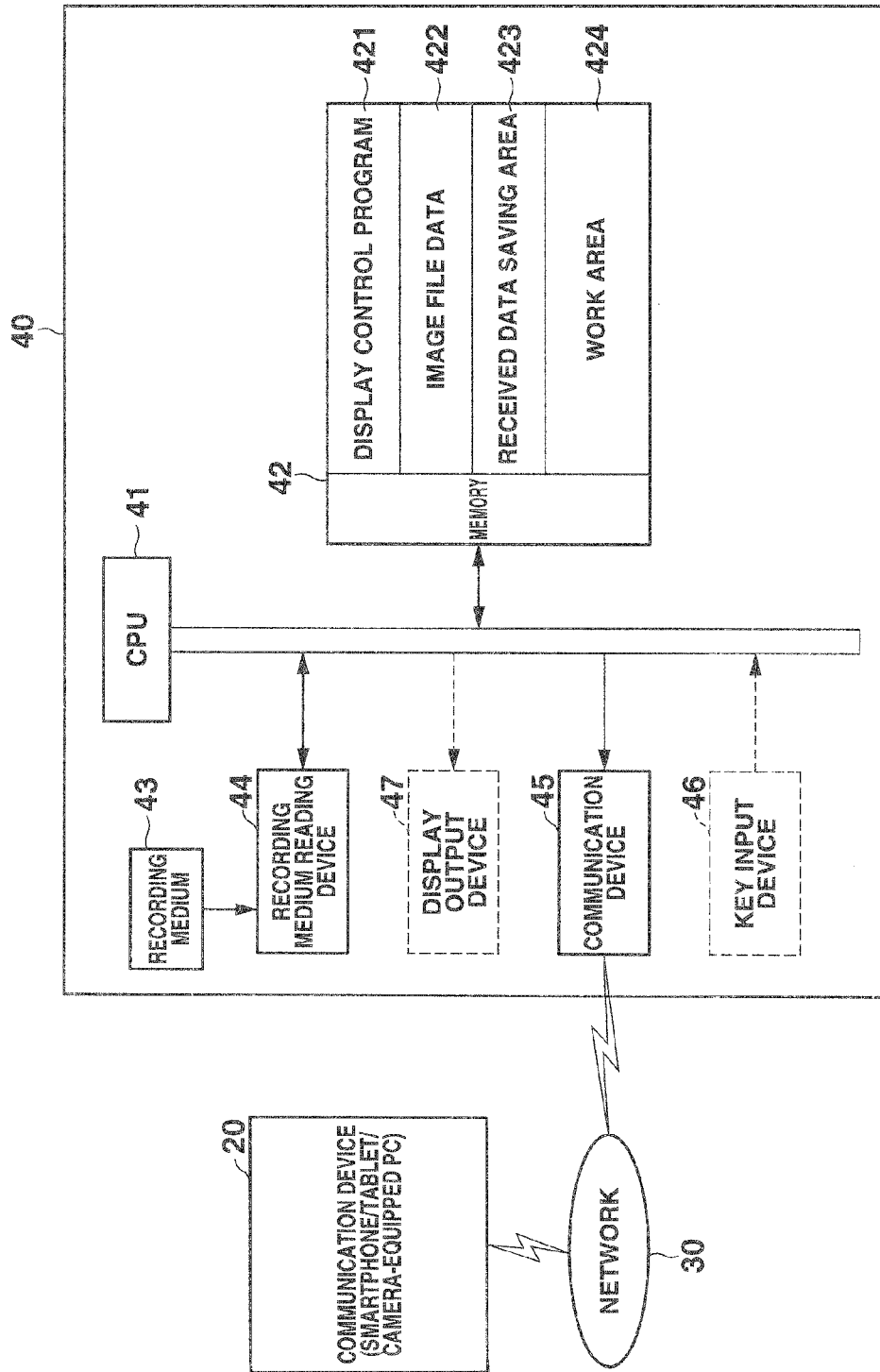

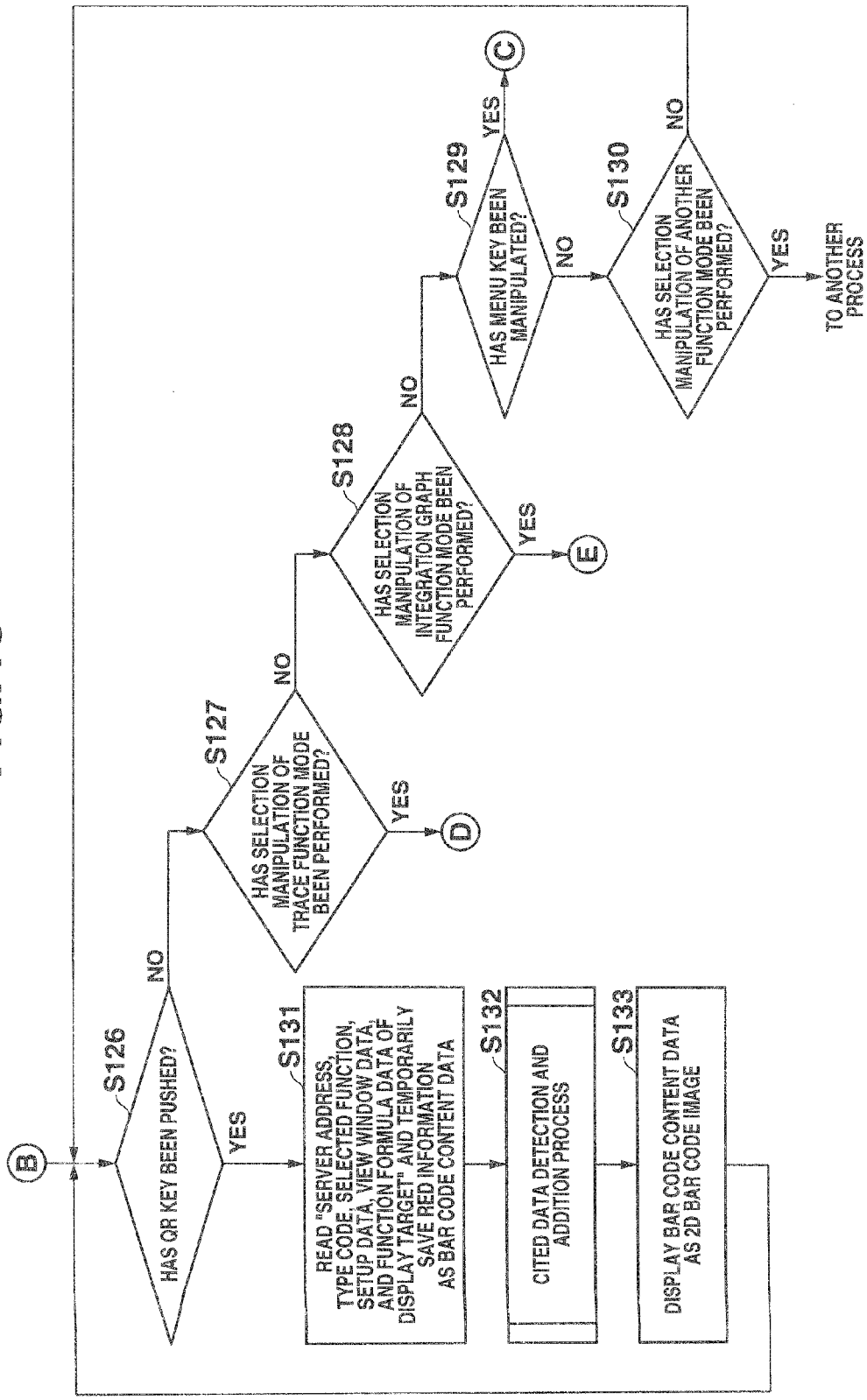

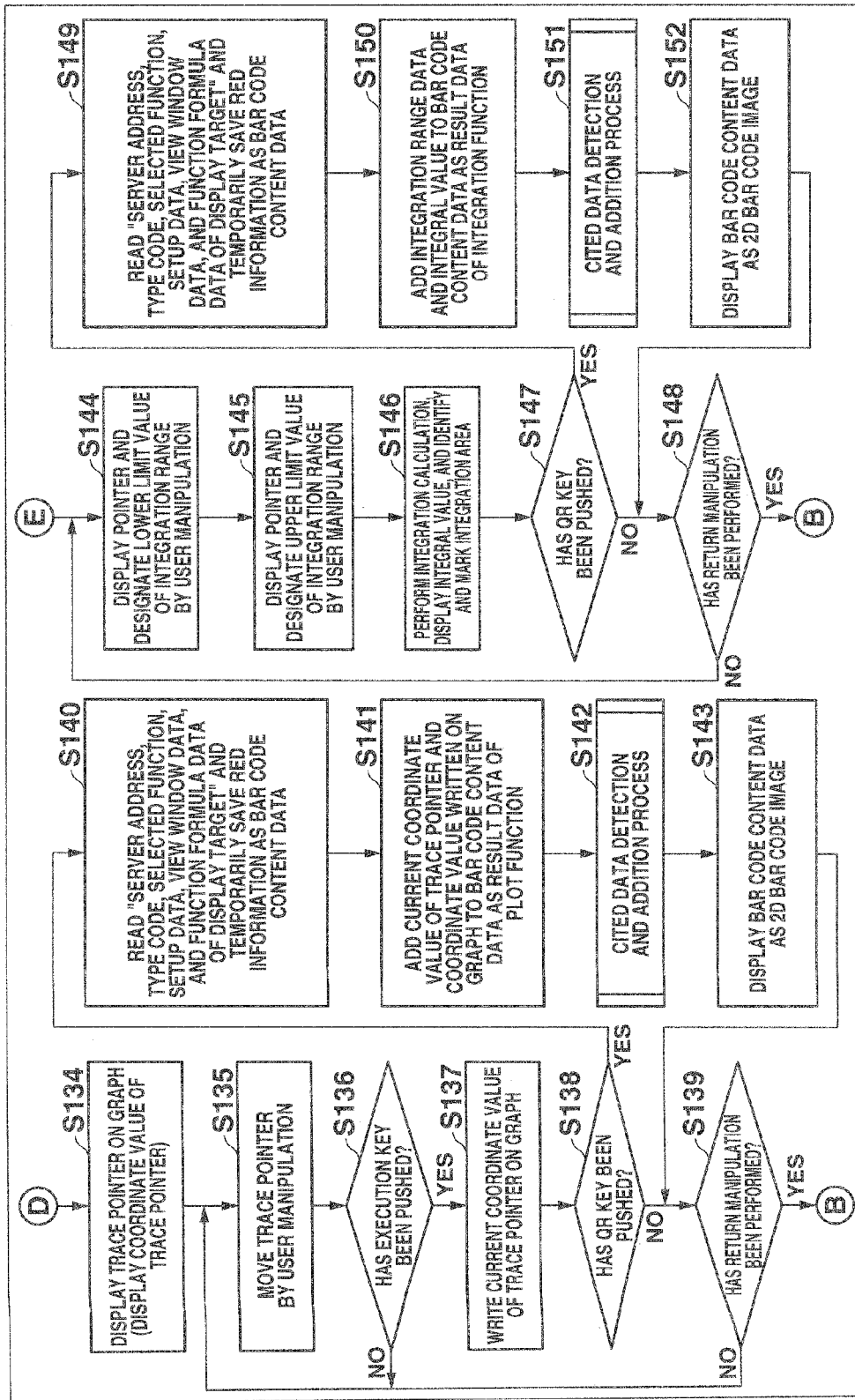

FIG.5A

[SHIFT]+[MENU]
(=[SET UP])

Input/Output : Math
Draw Type : Connect
Ineq Type : Union
Graph Func : On
Dual Screen : Off
Simul Graph : Off
Drivative : Off
[Math] [Line]

FIG.5B

Background : fountain
Plot/LineCol : Green
Sketch Line : Norm
Angle : Rad
Complex Mode : Real
Coord : On
Grid : Line
[None] [PICTn] [OPEN]

FIG.5C

Angle : Rad
Complex Mode : Real
Coord : On
Grid : Line
Axes : Scale
Label : On
Display : Norm
[On] [Off] [Scale]

FIG.5D

[SHIFT]+[F3]
(=[V-Window])

View Window
Xmin : -6.3
max : 6.3
scale : 1
dot : 0.03333333
Ymin : -0.7
max : 5.5
[INTIAL] [TRIG] [STANDRD] [V-MEM] [SQUARE] [RGV-WIN]

FIG.5E

View Window
Ymin : -0.7
max : 5.5
scale : 1
T0min : 0
max : 6.2831853
ptch : 0.06283185
[INTIAL] [TRIG] [STANDRD] [V-MEM] [SQUARE] [RGV-WIN]

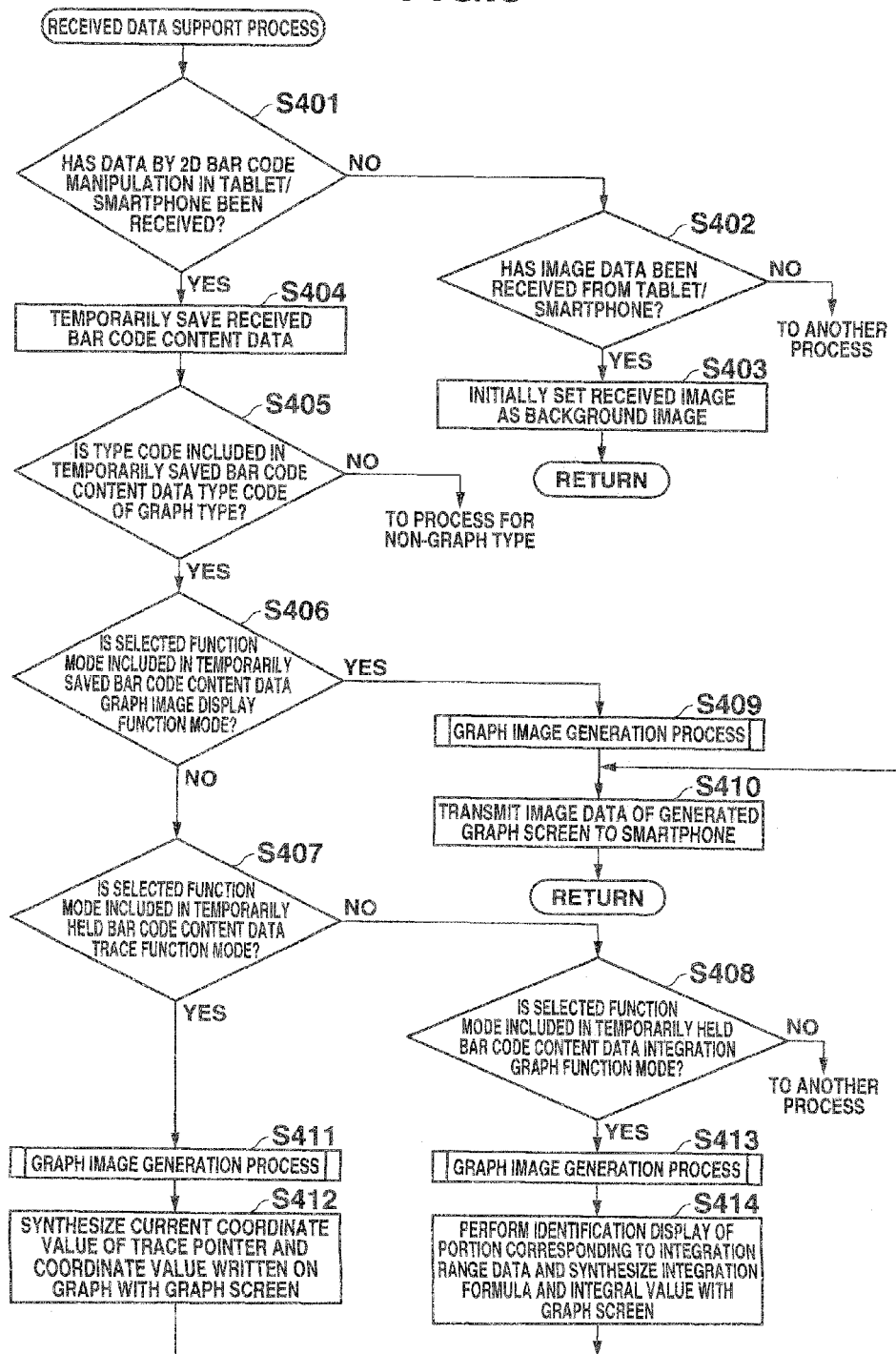

ELECTRONIC DEVICE WHICH DISPLAYS AND OUTPUTS FUNCTION FORMULA DATA, DATA OUTPUT METHOD, AND COMPUTER READABLE MEDIUM

CROSS-REFERENCE TO RELATED APPLICATIONS

This application is based upon and claims the benefit of priority from Japanese Patent Applications No. 2014-239325, filed Nov. 26, 2014; No. 2014-191868, filed Sep. 19, 2014; No. 2014-191879, filed Sep. 19, 2014; No. 2014-239297, filed Nov. 26, 2014; No. 2014-239383, filed Nov. 26, 2014; No. 2014-239295, filed Nov. 26, 2014; No. 2014-236135, filed Nov. 21, 2014; No. 2014-236083, filed Nov. 21, 2014; and No. 2014-253833, filed Dec. 16, 2014, the entire contents of all of which are incorporated herein by reference.

BACKGROUND OF THE INVENTION

1. Field of the Invention

The present invention relates to an electronic device and a data output method in an electronic device.

2. Description of the Related Art

In the past, a graph display device that is called a graph function calculator and displays a graph image according to a function formula of a graph formula has been widely used. For example, a graph display system disclosed in Patent Document 1 (Japanese Patent No. 4720607) has also been proposed. The graph display system transmits a function formula of a graph formula serving as a source of a graph image displayed on a certain graph display device to another graph display device, and another graph display device displays the graph image according to the function formula of the graph formula.

In recent years, a calculation server that allows access from a communication device such as a smartphone and provides a high-performance calculation service to the communication device has also been provided.

In the system disclosed in Patent Document 1, the function formula of the graph formula in the graph display device can be transmitted, and an external device can display the graph image corresponding to the function formula of the graph formula. However, to this end, it is necessary to appropriately set various kinds of pieces of data including the function formula of the graph formula in the graph display device as an external output target and outputs the set data to the outside. In the graph display device of the related art, there are cases in which it is difficult to perform an appropriate external output target setting, and it is difficult to display the graph image in the external device.

Particularly, when there is a limitation to a data capacity that can be output to the outside, it is important to set a proper amount of external output data and output the data.

BRIEF SUMMARY OF THE INVENTION

It is an object of the present invention to provide an electronic device and a data output method in an electronic device, which are capable of appropriately setting various kinds of pieces of data including a function formula of the graph formula in a device as an external output target and outputting the set data to the outside and thus displaying a graph image corresponding to the function formula of the graph formula in an external device.

An electronic device according to the present invention includes a processor, wherein the processor is configured to perform: a formula input process of inputting a plurality of pieces of formula data in association with respective formula numbers through a user operation; a formula setting process of setting formula data in the pieces of formula data input by the formula input process as an output target by the user operation; a cited formula extraction process of extracting another formula data in the pieces of formula data when the formula data set by the formula setting process cites a formula number of the another formula data; and a data output process of outputting the set formula data with the extracted another formula data.

According to the present invention, It is possible to appropriately set various kinds of pieces of data including a function formula of a graph formula in an electronic device as an external output target and output the set data to the outside Thus, it is possible to display a graph image corresponding to the function formula of the graph formula in an external device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram illustrating a circuit configuration of a calculation server;

FIG. 4C is a diagram illustrating a third portion of a flowchart of a display control process of a graph function calculator;

FIG. 4D is a diagram illustrating a fourth portion of a flowchart of a display control process of a graph function calculator;

FIGS. 5A, 5B, and 5C are diagrams illustrating an exemplary setup screen of a graph function calculator;

FIGS. 5D and 5E are diagrams illustrating an exemplary view window setting screen of a graph function calculator;

FIG. 9 is a diagram illustrating a flowchart of a received data support process of a calculation server;

DETAILED DESCRIPTION OF THE INVENTION

Hereinafter, exemplary embodiments of the present invention will be described.

First Embodiment

Figure 1:
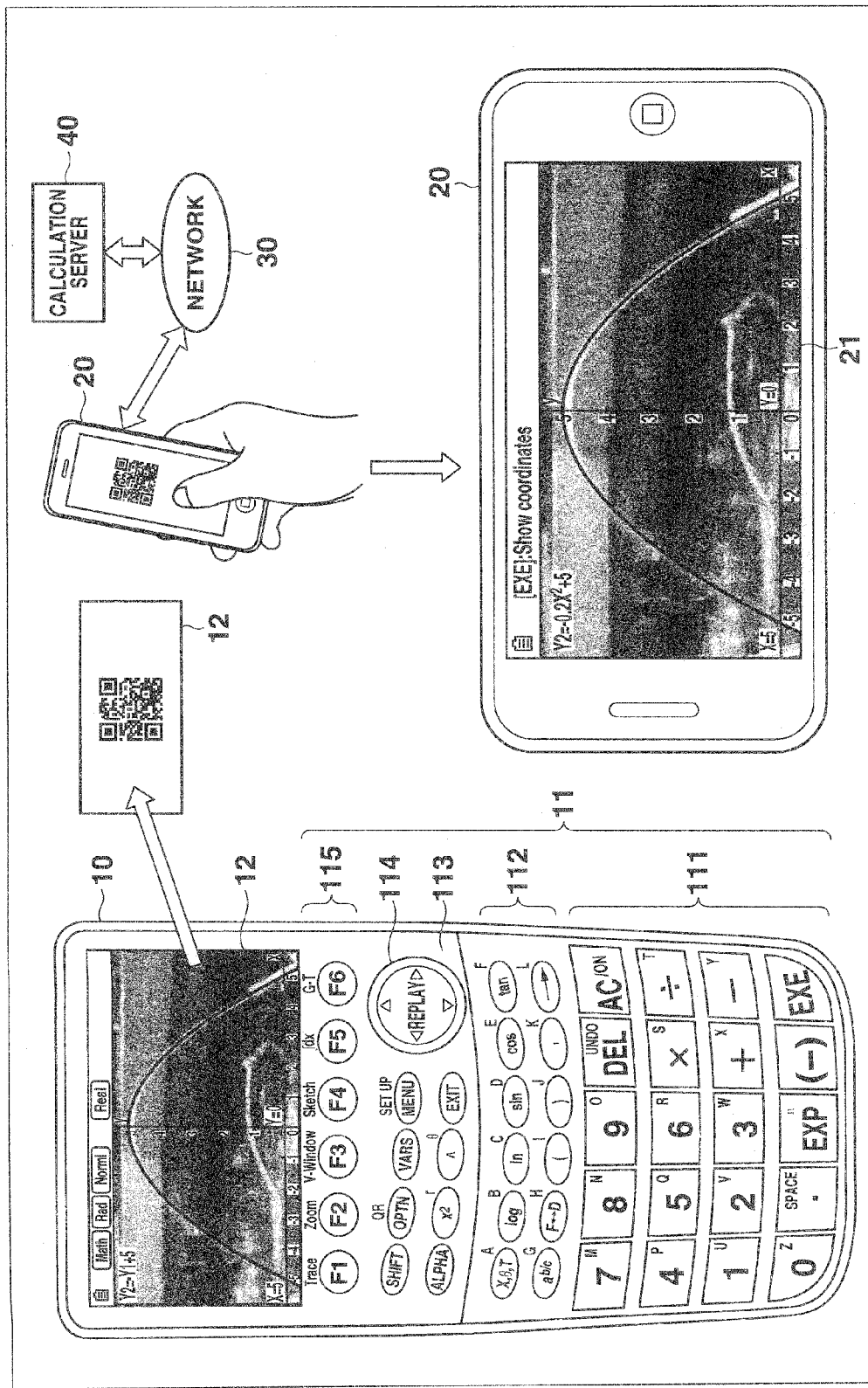
FIG. 1 is a schematic diagram illustrating an external appearance configuration of a graph function calculator serving as a formula input device and a graph display device according to a first embodiment of the present invention and a relation between a graph function calculator and a calculation server according to the first embodiment of the present invention.

Here, a description will proceed with an example of a system including a graph function calculator 10 serving as a formula input device and a graph display device according to a first embodiment of the present invention, a camera-equipped communication device 20, and a calculation server 40 according to the first embodiment of the present invention as illustrated in FIG. 1. The camera-equipped communication device 20 is, for example, a smartphone that photographs a two-dimensional (2D) code such as a QR code (a registered trademark) displayed and output from the graph function calculator 10. The calculation server 40 is accessible via a communication network 30 such as the Internet according to content of the 2D code photographed by the camera-equipped communication device 20. The communication device 20 is not limited to a smartphone and may be configured as personal digital assistants (PDA), a tablet personal computer (PC), a laptop PC, or the like.

The graph function calculator 10 has a small size which can be sufficiently gripped by one hand of the user due to the need for portability and operated by one hand. A key input device 11 and a display output device 12 are installed on the front surface of the main body of the graph function calculator 10.

The key input device 11 includes a number/operator key group 111, a function functional key group 112, a mode setting key group 113, a cursor key 114, and a function key group 115. The number/operator key group 111 is a group of keys for inputting a number or a mathematical formula or instructing execution of a calculation. The function functional key group 112 is a group of keys for inputting various kinds of functions or launching a memory function. The mode setting key group 113 is a group of keys for display a menu screen of various kinds of operation modes or instructing a setting of an operation mode. The cursor key 114 is a key for performing a movement operation of a cursor displayed on the display output device 12, a selection operation of a data item, and the like. The function key group 115 is a group of keys for performing, for example, a selection operation of a function appropriately allocated to each key displayed on the display output device 12.

As the number/operator key group 111, [0] to [9] (numbers) keys, [+] [−] [×] [÷] (four operation symbols) keys, an [EXE] (execution) key, an [AC] (clear) key, and the like are arranged.

As the function functional key group 112, a [log] (log) key, a [sin] (sign) key, a [(] (parenthesis) key, and the like are arranged.

As the mode setting key group 113, an [OPTN] (option) key, a [MENU] (menu) key, a [SHIFT] (shift) key, an [ALPHA] (alphabet) key, and the like are arranged.

The keys of the number/operator key group 111, the function functional key group 112, and the mode setting key group 113 can function as the keys written above the keys other than key functions written on keycaps by operating the keys continuously after the [SHIFT] key is operated. For example, when the [SHIFT] key is operated and then the [AC] key is operated (hereinafter, referred to as a "[SHIFT]+[AC] key." The same applies hereinafter.), it functions as an [OFF] (power off) key. A [SHIFT]+[OPTN] key functions as a [QR] (QR) key.

The display output device 12 includes a dot matrix type liquid crystal display unit.

Figure 2:
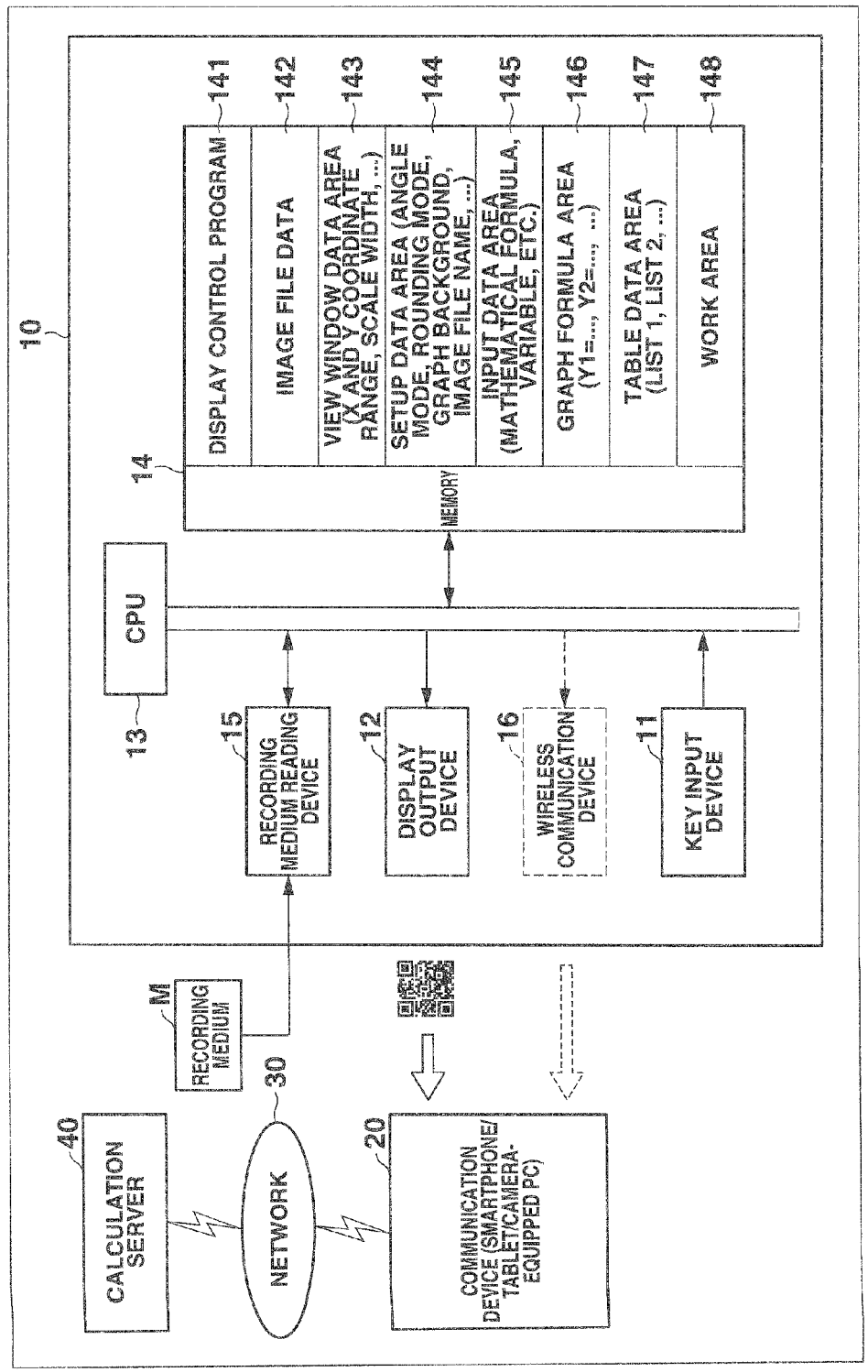
FIG. 2 is a diagram illustrating a circuit configuration of a graph function calculator.
Figure 4A:
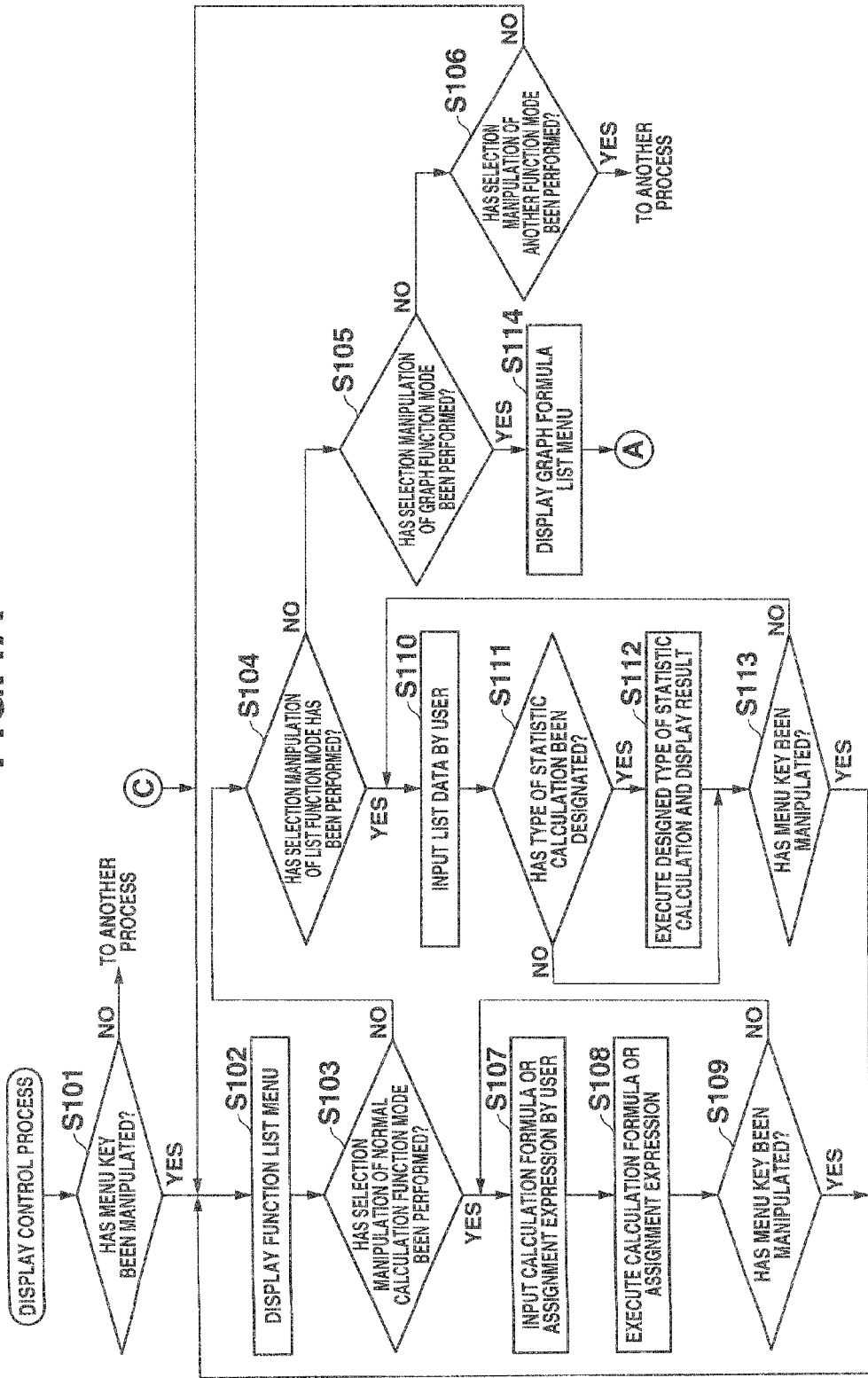
FIG. 4A is a diagram illustrating a first portion of a flowchart of a display control process of a graph function calculator.
Figure 4B:
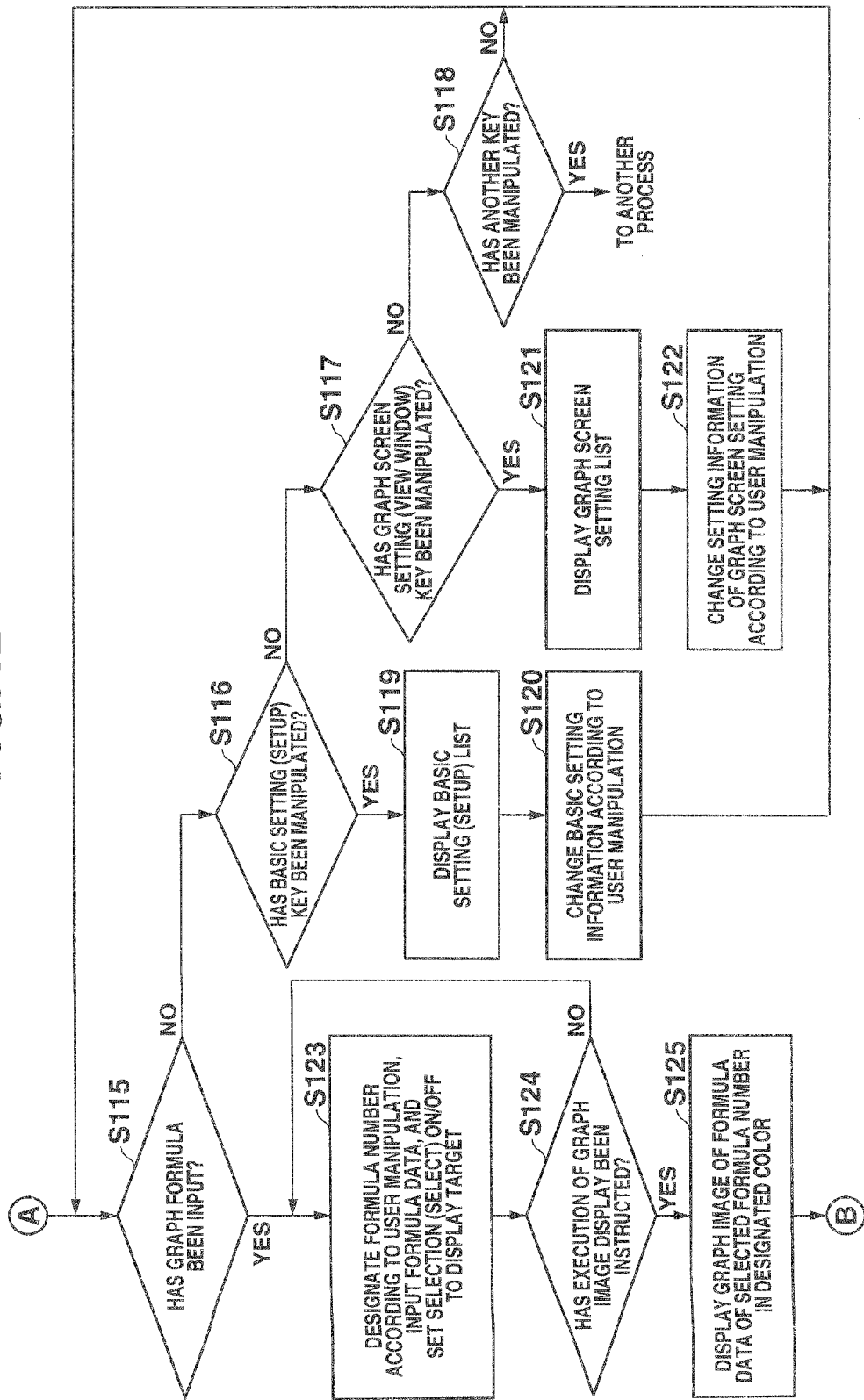
FIG. 4B is a diagram illustrating a second portion of a flowchart of a display control process of a graph function calculator.

FIG. 2 is a block diagram illustrating a configuration of an electronic circuit of the graph function calculator 10.

The electronic circuit of the graph function calculator 10 includes a circuit configuring the key input device 11 and the display output device 12. The electronic circuit further includes a CPU 13 serving as a computer, a memory 14, and a circuit configuring a recording medium reading device 15. The electronic circuit may further include a wireless communication device 16 as indicated by a broken line in FIG. 2.

The CPU 13 controls an operation of each circuit or each device according to a display control program 141 stored in the memory 14, and executes various kinds of operation processes according to a key input signal supplied from the key input device 11. The display control program 141 may be stored in the memory 14 in advance or may be read from an external recording medium M via the recording medium reading device 15 and stored in the memory 14. The display control program 141 is not allowed to be modified by operating the key input device 11 by the user.

The display control program 141 may include a server address serving as an Internet address of the calculation server 40. The display control program 141 may be configured to be stored in the memory 14 not to be modified by the user, independently of the server address.

Although not particularly illustrated, the memory 14 may store a type code of the graph function calculator 10 so that the type code is not allowed to be modified by the user.

In addition to information that is not allowed to be modified by the user, in order to stores data that is not allowed to be modified by the user, an image file data memory 142, a view window data area 143, a setup data area 144, an input data area 145, a graph formula area 146, a table data area 147, a work area 148, and the like are secured in the memory 14.

The image file data memory 142 stores an image file to be displayed on the display output device 12 as a background image, and stores a plurality of image files in advance. The user may register an arbitrary image file in the image file data memory 142. The arbitrary image file may be read from the external recording medium M such as the memory card via the recording medium reading device 15 and stored in the image file data memory 142. The image file data memory 142 may receive an image file photographed by the camera-equipped communication device 20 such as the smartphone via the wireless communication device 16 and stores the received image file.

Setting information of a graph screen setting on a graph function mode set by operating a graph screen setting key ([SHIFT]+[F3] (=[V-Window]) key) of the key input device 11 is stored in the view window data area 143. As the setting information of the graph screen setting, for example, coordinate ranges of an x axis and a y axis, scale intervals (scale widths) of both axes of a graph image displayed on the display output device 12 are registered.

Basic setting information on a graph function mode set by operating a basic setting key ([SHIFT]+[MENU] (=[SET UP]) key) of the key input device 11 is stored in the setup data area 144. As the basic setting information, for example, an angle mode (deg (degree) mode/rad (radian) mode/gra (grade) mode), a rounding mode (Fix (fix the number of decimal places) mode/Sci (designate the number of significant figures) mode/Norm mode (no rounding)), a display mode (a background image is not displayed/an image stored in the image file data memory 142 in advance is designated as a background/an arbitrary image registered in the image file data memory 142 by the user is designated as a background; an image file name) of a graph back ground image, and the like are registered A predetermined initial set mode is set to the setup data area 144 in an initial state.

A mathematical formula (a calculation formula, an assignment expression, or a function formula) or a variable which is key-input by the key input device 11 is stored in the input data area 145. For example, a number key is stored as a code indicating a number, a function key such as "sin" is stored as a code indicating a corresponding function, an arithmetic symbol key such as "+," "−," "×," and "÷" is stored as a code indicating an arithmetic symbol. The variable means a variable used as a constant in a mathematical formula or a function formula of a graph formula, and for example, different numerical values are input for letters of A to Z. For example, a variable B is designated by performing a key operation of a [3] key, a [→] key, and an [ALPHA]+[log] key (=a [B] key) of the key input device 11, and data "3" of a variable value is set.

A function formula of a graph formula key-input by the key input device 11 is stored in the graph formula area 146. For example, a function formula of $Y1=0.2X^2$ is input to a graph formula of Y1 and stored.

Table data key-input by the key input device 11 is stored the table data area 147. Each column of a table is regarded as one list (List 1, List 2, and a numerical value or a variable (a variable name) is input to and stored in each cell.

Various kinds of pieces of data input or output to the CPU 13 according to the display control program 141 are temporarily stored in the work area 148 as necessary.

The wireless communication device 16 has a function of performing wireless communication such as Bluetooth (a registered trademark) or infrared communication with the external communication device 20 and the like.

The graph function calculator 10 having the above-described configuration implements a display control function of converting the server address, the type code of the graph function calculator 10, a function type (for example, a graph mode-graph image display function) input from the key input device 11, setup data, view window data, and function formula data into a 2D bar code, a QR code in the present embodiment, and displaying and outputting the 2D bar code or the QR code through the display output device 12 which will be mentioned in the following operation description as the CPU 13 controls an operation of each circuit or each device according to a command described in the display control program 141, and software and hardware operate in collaboration with each other.

The camera-equipped communication device 20 photographs an image of the 2D bar code (the QR code) displayed and output on the display output device 12 of the graph function calculator 10, and transmits data (hereinafter, referred to as "bar code content data (the QR data)") of content of the photographed 2D bar code (the QR code) to the calculation server 40 indicated by the server address included in the bar code content data via the communication network 30.

FIG. 3 is a block diagram illustrating a configuration of an electronic circuit of the calculation server 40.

The electronic circuit of the calculation server 40 includes a CPU 41 serving as a computer, a memory 42, a recording medium 43, a recording medium reading device 44, and a communication device 45. As indicated by a broken line in FIG. 3, the electronic circuit of the calculation server 40 may further include a key input device 46 or a display output device 47.

The CPU 41 controls an operation of each device according to a display control program 421 which is stored in the memory 42 in advance, read from the recording medium 43 such as a memory card onto the memory 42 via the recording medium reading device 44, or downloaded from a web server on the communication network 30 to the memory 42 via the communication device 45, and executes various kinds of operation processes according to the received bar code content data (the QR data) that is received from the camera-equipped communication device 20 by the communication device 45.

The memory 42 not only stores the display control program 421 but also secures an image file data memory 422, a received data saving area 423, and a work area 424.

Here, the image file data memory 422 can store image files corresponding to a plurality of image files which are registered in the image file data memory 142 of the memory 14 of the graph function calculator 10 in advance, receive an image file communicated from the camera-equipped communication device 20 such as the smartphone via the communication network 30 through the communication device 45, and store the received image file.

The received data saving area 423 is an area in which the bar code content data (the QR data) communicated from the camera-equipped communication device 20 such as the smartphone via the communication network 30 is received through the communication device 45 and stored.

The work area 424 is an area in which various kinds of pieces of data input or output to the CPU 41 according to the display control program 421 are temporarily stored as necessary.

The display control program 421 has a function of performing a setting operation according to a setting operation of the key input device 46 by the operator of the calculation server 40, a maintenance operation according to a maintenance operation, and the like, a function of displaying an interim process or a result of the operation through the display output device 47, and the like.

The calculation server 40 having the above-described configuration implements a received data support process function which will be mentioned in the following operation description as the CPU 41 controls an operation of each device according to a command described in the display control program 421, and software and hardware operate in collaboration with each other. The received data support process function refers to a function of performing a calculation of a mathematical formula based on the received bar code content data (the QR data) and transmitting the calculation result to the camera-equipped communication device 20 serving as a transmission source of the received bar code content data (the QR data).

The camera-equipped communication device 20 can cause the calculation result received from the calculation server 40 via the communication network 30 to be displayed on a display output device 21.

Next, the display control function of the graph function calculator 10 will be described with reference to a flowchart of a display control process of FIGS. 4A to 4D.

When the operation of the key input device 11 is performed, the CPU 13 of the graph function calculator 10 determines whether or not the operation of the key input device 11 is the menu key (the [MENU] key) operation (step S101). Here, when the operation of the key input device 11 is determined to be not the menu key operation, the CPU 13 causes the process to proceed to another process. This does not relate directly to the present invention, and thus a description thereof is omitted.

On the other hand, when the operation of the key input device 11 is determined to be the menu key operation, the CPU 13 causes a function list menu to be displayed on the display output device 12 (step S102). Then, the CPU 13 determines whether or not a selection operation of a normal calculation function mode has been performed (step S103). Here, when the selection operation of the normal calculation function mode is determined to have been performed, the CPU 13 causes the process to proceed to step S107 which will be described later.

On the other hand, when the selection operation of the normal calculation function mode is determined to have not been performed, the CPU 13 further determines whether or not a selection operation of a list function mode has been performed (step S104). Here, when the selection operation of the list function mode is determined to have been performed, the CPU 13 proceeds to a process of step S110 which will be described later.

On the other hand, when the selection operation of the list function mode is determined to have not been performed, the CPU 13 further determines whether or not a selection operation of a graph function mode has been performed (step S105). Here, when the selection operation of the graph function mode is determined to have been performed, the CPU 13 proceeds to a process of step S114 which will be described later.

On the other hand, when the selection operation of the graph function mode is determined to have not been performed, the CPU 13 determines whether or not a selection operation of another function mode has been performed (step S106). Here, when the selection operation of another function mode is determined to have not been performed, the CPU 13 returns to the process of step S102. On the other hand, when the selection operation of another function mode is determined to have been performed, the CPU 13 proceeds to another process.

Here, for example, the function list menu is a function list menu in which functions are indicated by icons, and the icons are arranged extensively. The CPU 13 changes an icon selection state according to the operation of the cursor key 114 of the key input device 11. In other words, the CPU 13 performs identification display of reversely display an icon that is currently selected. When the [EXE] (execution) key of the key input device 11 is operated, the selection operation of the function mode indicated by the icon is determined to have been performed.

When the selection operation of the function mode other than the normal calculation function mode, the list function mode, and the graph function mode is determined to have been performed in step S106, the process of the selected function mode is performed. This does not relate directly to the present invention, and thus a description thereof is omitted.

When the selection operation of the normal calculation function mode is determined to have been performed in step S103, the CPU 13 receives a calculation formula or an assignment expression (for example, 4→T (T=4) or the like) input by the user operation of the key input device 11, and stores the received calculation formula or the received assignment expression in the input data area 145 of the memory 14 (step S107). Then, the CPU 13 executes the calculation formula stored in the input data area 145 of the memory 14, and causes the obtained result to be displayed on the display output device 12. Further, the CPU 13 executes the assignment expression input by the user operation, and sets data (for example, 4) of a variable value of a variable (for example, T) in a work area of the memory (step S108).

Thereafter, the CPU 13 determines whether or not the menu key (the [MENU] key) operation has been performed (step S109). Here, when the menu key operation is determined to have not been performed, the CPU 13 returns to the process of step S107. On the other hand, when the menu key operation is determined to have been performed, the CPU 13 returns to the process of step S102.

Further, when the selection operation of the list function mode is determined to have been performed in step S104, the CPU 13 receives list data input by the user operation of the key input device 11, and stores the received list data in the table data area 147 of the memory 14 (step S110). The list data is data that can be used for the four arithmetic operations, a statistic calculation, graph image display, or the like, and a cell of a table form is selected by the operation of the cursor key 114, and a numerical value or a variable is input. Thereafter, the CPU 13 determines whether or not a type of statistic calculation has been designated by the user operation of the key input device 11 (step S111). Here, when the type of statistic calculation is determined to have not been designated, the CPU 13 proceeds to a process of step S113 which will be described later.

On the other hand, when the type of statistic calculation is determined to have been designated, the CPU 13 executes a designated type of statistical process on the list data stored in the table data area 147 of the memory 14, and causes the obtained result to be displayed on the display output device 12 (step S112).

Thereafter, the CPU 13 determines whether or not the menu key (the [MENU] key) operation has been performed (step S113). Here, when the menu key operation is determined to have not been performed, the CPU 13 causes the process to return to step S110. On the other hand, when the menu key operation is determined to have been performed, the CPU 13 returns to the process of step S102.

Further, when the selection operation of the graph function mode is determined to have been performed in step S105, the CPU 13 causes a graph formula list menu to be displayed and output on the display output device 12 (step S114).

Thereafter, the CPU 13 determines whether or not the input operation of the graph formula has been performed by the user operation of the key input device 11 (step S115). Here, when the input operation of the graph formula is determined to have been performed, the CPU 13 proceeds to a process of step S123 which will be described later.

On the other hand, when the input operation of the graph formula is determined to have not been performed, the CPU 13 further determines whether or not the operation of the basic setting key (the [SHIFT]+[MENU] (=[SET UP]) key) of the key input device 11 been performed (step S116). Here, when the operation of the basic setting key is determined to have been performed, the CPU 13 proceeds to a process of step S119 which will be described later.

On the other hand, when the operation of the basic setting key is determined to have not been performed, the CPU 13 further determines whether or not the operation of the graph screen setting key (the [SHIFT]+[F3] (=[V-Window]) key) of the key input device 11 has been performed (step S117). Here, when the operation of the graph screen setting key is determined to have been performed, the CPU 13 proceeds to a process of step S121 which will be described later.

On the other hand, when the operation of the graph screen setting key is determined to have not been performed, the CPU 13 further determines whether or not another key of the key input device 11 has been operated (step S118). Here, when another key is determined to have not been operated, the CPU 13 returns to the process of step S115. However, when another key is determined to have been operated, the CPU 13 proceeds to another process corresponding to the operated key. This does not relate directly to the present invention, and thus a description thereof is omitted.

When the operation of the basic setting key is determined to have been performed in step S116, the CPU 13 causes a basic setting (setup) list to be displayed and output on the display output device 12 (step S119). Then, the basic setting information stored in the setup data area 144 of the memory 14 is changed according to the user operation of the key input device 11 (step S120). Step S120 ends the operation of the [EXE] (execution) key, and the CPU 13 returns to the process of step S115.

FIGS. 5A to 5C illustrate an exemplary basic setting (setup) list displayed and output on the display output device 12. Respective items are selected by a vertical operation of the cursor key 114 of the key input device 11 (an item being currently selected is identified and displayed, for example, reversed and displayed), and an item that is not displayed on the display output device 12 is scrolled and displayed according to the vertical operation of the cursor key 114.

Here, [Input/Output] is a setting item of an input or output mode, and a [Math] (natural input or output) mode or a [Line] (line input or output) mode can be set. FIG. 5A illustrates a state in which the setting item of [Input/Output] is selected by the operation of the cursor key 114, and the [Math] mode of the initial mode is set as the setting information.

[Draw Type] is a graph image display type setting item, and a [Connect] (image display by a line obtained by connecting points of a graph) mode or a [Plot] (image display by only dots) mode can be set. In FIG. 5A, the [Connect] mode serving as the initial mode is set for the setting item of [Draw Type].

[Ineq Type] is an inequality filling setting item, and an [Intsect] (only a range satisfying conditions of all inequalities is filled when images of a plurality of inequalities are displayed) mode or a [Union] (only a range satisfying a condition of each inequality is all filled) mode can be set. In FIG. 5A, the [Union] mode serving as the initial mode is set for the setting item of [Ineq Type].

[Graph Func] is a graph function formula display setting item, and an [On] (a function formula is displayed during graph image display or trace) mode or an [Off] (a function formula is not displayed during graph image display or trace) mode can be set. In FIG. 5A, the [On] modes serving as the initial mode is set for the setting item of [Graph Fund].

[Dual Screen] is a screen division display setting item, and a [G+G] (a screen is divided, and two graphs are displayed) mode, a [GtoT] (a screen is divided, and a numerical table is created from a graph) mode, or an [Off] (a screen is not divided) mode can be set. In FIG. 5A, the [Off] mode serving as the initial mode is set for the setting item of [Dual Screen].

[Simul Graph] is a simultaneous graph rendering setting item, and an [On] (graphs of registered function formulas are simultaneously displayed) mode or an [Off] (graphs of registered function formulas are displayed in order) mode can be set. In FIG. 5A, the [Off] mode serving as the initial mode is set for the setting item of [Simul Graph].

[Derivative] is a differential coefficient display setting item, and an [On] (a differential coefficient value is displayed on a numerical table or during trace) mode or an [Off] (a differential coefficient value is not displayed on a numerical table or during trace) mode can be set. In FIG. 5A, the [Off] mode serving as the initial mode is set for the setting item of [Derivative].

[Background] is a background image display setting item, and a [None] (a background image is not displayed) mode, a [PICT n] (an image registered in the image file data memory 142 in advance is designated as a background) mode, or an [OPEN] (an arbitrary image registered in the image file data memory 142 by the user is designated as a background) mode can be set. FIG. 5B illustrates a state in which the setting item of [Background] is designated, the [OPEN] mode is selected, and an image file having a file name of [fountain] is set from the image file data memory 142.

[Plot/LineCol] is a color setting item of a plot point and a graph line, and a [Black] (black) mode, a [Blue] (blue)

mode, a [Red] (red) mode, a [Magenta] (magenta) mode, a [Green] (green) mode, a [Cyan] (cyan) mode, or a [Yellow] (yellow) mode can be set. In FIG. 5B, for the setting item of [Plot/LineCol], a setting is changed from the [Green] mode serving as the initial mode to the [Red] mode.

[Sketch Line] is an image display line setting item of a sketch function, and a [Norm] (standard) mode, a [Heavy] (heavy line) mode, a [Broken] (broken line) mode, a [Dotted] (dotted line) mode, or a [Thin] (extra fine, line) mode can be set. In FIG. 5B, the [Norm] mode serving as the initial mode is set for the setting item of [Sketch Line].

[Angle] is an angle unit setting item, and a [Rad] (an angle unit is set to a radian (radian measure)) mode, a [Deg] (an angle unit is set to a degree (degree measure) mode, or a [Gra] (an angle unit is set to a grade) mode can be set. In FIG. 5B, the [Rad] mode serving as the initial mode is set for the setting item of [Angle].

[Complex Mode] is a complex number calculation mode setting item, and a [Real] (a calculation is performed only within a real number range) mode, an [a+bi] (a complex number operation is performed, and a result is displayed in a rectangular form) mode, or an [r∠θ] (a complex number operation is performed, and a result is displayed in a polar form) mode can be set. In FIG. 5B, the [Real] mode serving as the initial mode is set for the setting item of [Complex Mode].

[Coord] is a pointer coordinate value display setting item, and an [On] (a pointer coordinate value is displayed on a graph screen) mode or an [Off] (a pointer coordinate value is not displayed on a graph screen) mode can be set. In FIG. 5B, the [On] mode serving as the initial mode is set for the setting item of [Coord].

[Grid] is a graph coordinate grid point display setting item, and an [On] (a grid point is displayed on a graph screen) mode, [Off] (a grid point is not displayed on a graph screen) mode, or a [Line] (a grid line is displayed on a graph screen) mode can be set. In FIG. 5B, the [Line] mode serving as the initial mode is set for the setting item of [Grid].

[Axes] is a graph coordinate axis display setting item, and an [On] (a coordinate axis is displayed on a graph screen) mode, an [Off] (a coordinate axis is not displayed on a graph screen) mode, or a [Scale] (a coordinate axis and a scale are displayed on a graph screen) mode can be set. FIG. 5C illustrates a state in which the setting item of [Axes] is selected by the operation of the cursor key 114, and the [Scale] mode serving as the initial mode is set as the setting information.

[Label] is a graph coordinate axis name display setting item, and [On] (a coordinate axis name is displayed on a graph screen) mode or an [Off] (a coordinate axis name is not displayed on a graph screen) mode can be set. In FIG. 5C, the [On] mode serving as the initial mode is set for the setting item of [Label].

[Display] is a display form setting item, and a [Fix] (the number of decimal places setting) mode, an [Sci] (the number of significant figures setting) mode, a [Norml] (standard display setting) mode, or an [Eng] (Eng symbol display setting) mode can be set. In FIG. 5C, the [Norml] Mode serving as the initial mode is set for the setting item of [Display].

Further, when the operation of the graph screen setting key is determined to have been performed in step S117, the CPU 13 causes the graph screen setting list to be displayed and output on the display output device 12 (step S121). Then, the setting information of the graph screen setting stored in the view window data area 143 of the memory 14 is changed according to the user operation of the key input device 11 (step S122). Step S122 ends by the operation of the [EXE] (execution) key, and the CPU 13 returns to the process of step S115.

FIGS. 5D and 5E illustrate an exemplary graph screen setting list displayed and output on the display output device 12. Each item is selected by the vertical operation of the cursor key 114 of the key input device 11 (an item being currently selected is identified and displayed, for example, reversed and displayed), and an item that is not displayed on the display output device 12 is scrolled and displayed according to the vertical operation of the cursor key 114.

Here, [Xmin] is an x axis minimum value setting item. FIG. 5D illustrates a state in which the setting item of [Xmin] is selected by the operation of the cursor key 114, and [−6.3] is set as the minimum value by the operation of the number/operator key group 111.

[Xmax] is an x axis maximum value setting item. FIG. 5D illustrates a state in which [6.3] is set as a maximum value for the setting item of [Xmax].

[Xscale] is an x axis scale interval setting item. FIG. 5D illustrates a state in which [1] is selected as a scale interval for the setting item of [Xscale].

[Xdot] is a setting item of a value per bit in the x axis direction. FIG. 5D illustrates a state in which [0.03333333] is set as a value per bit for the setting item of [Xdot].

Here, [Ymin] is a y axis minimum value setting item. FIG. 5D illustrates a state in which [—0.7] is set as a minimum value for the setting item of [Ymin].

[Ymax] is a y axis maximum value setting item. FIG. 5D illustrates a state in which [5.5] is set as a maximum value for the setting item of [Ymax].

[Yscale] is a y axis scale interval setting item. FIG. 5E illustrates a state in which [1] is set as a scale interval for the setting item of [Yscale].

[Tθmin] is a setting item of a minimum value of T and θ in a polar coordinate graph. FIG. 5E illustrates a state in which the setting item of [Tθmin] is selected by the operation of the cursor key 114, and [0] is set as a minimum value by the operation of the number/operator key group 111.

[Tθmax] is a setting item of a maximum value of T and θ in a polar coordinate graph. FIG. 5E illustrates a state in which [6.2831853] is set as a maximum value for the setting item of [Tθmax].

[Tθptch] is a setting item of a pitch of T and θ in a polar coordinate graph. FIG. 5E illustrates a state in which [0.06283185] is set as a pitch for the setting item of [Tθptch].

Figure 6A:
FIGS. 6A and 6C are diagrams illustrating an exemplary graph formula input screen of a graph function calculator.

In step S114, the CPU 13 causes the graph formula list menu illustrated in FIG. 6A to be displayed and output on the display output device 12. When the input operation of the graph formula is performed in the graph formula list menu, in step S115, the CPU 13 determines that the input operation of the graph formula has been performed. Then, the CPU 13 designates a graph formula number (for example, Y1) according to the user operation, inputs data (for example, $Y1=0.2X^2$) of the graph formula number (Y1), sets whether or not the formula data of the graph formula is set as the display target (step S123). The selecting of whether or not the formula data of the graph formula is set as the display target may be designated by a operation of an [F1] key (a select key) of the function key group 115. When the selecting of the display target is designated, the identification display or the reverse display of [=] in the formula data of the graph formula is performed. In the drawings, for the sake of convenience, a difference in a color is indicated by a difference in a line type.

Figure 6B:
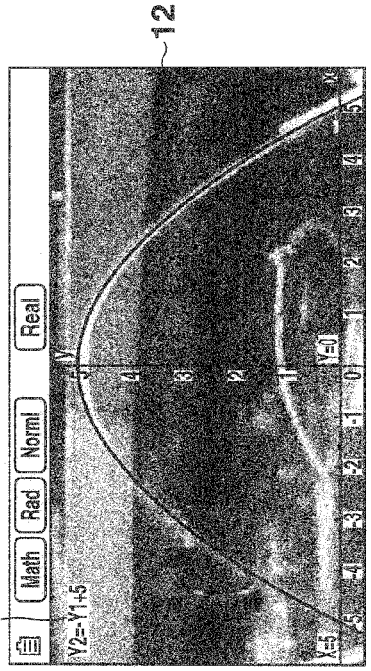
FIGS. 6B and 6D are diagrams illustrating exemplary display of a graph image corresponding to a graph formula input on a graph formula input screen of FIGS. 6A and 6C.

Then, the CPU 13 determines whether or not execution of graph image display has been instructed by the operation of the [EXE] key (the execution key) (step S124). Here, when the execution of the graph image display is determined to have not been instructed, the CPU 13 returns to the process of step S123. On the other hand, when the execution of the graph image display is determined to have been instructed, the CPU 13 causes the graph image of the selected graph formula to be displayed and output on the display output device 12 in each designated color as illustrated in FIG. 6B (step S125). At the time of the graph image display output, a graph formula 121 corresponding to the graph image is also displayed and output.

Thereafter, the CPU 13 determines whether or not whether or not the [QR] key, that is, the [SHIFT]+[OPTN] key of the key input device 11 has been pushed (step S126). Here, when the [QR] key is determined to have been pushed, the CPU 13 proceeds to a process of step S131 which will be described later.

On the other hand, when the [QR] key is determined to have not been pushed, the CPU 13 further determines whether or not determines whether or not a selection operation of a trace function mode has been performed by pushing the [Trace] key, that is, a [SHIFT]+[F1] key of the key input device 11 (step S127). Here, when the selection operation of the trace function mode is determined to have been performed, the CPU 13 proceeds to a process of step S134 which will be described later.

On the other hand, when the selection operation of the trace function mode is determined to have not been performed, the CPU 13 further determines whether or not a selection operation of an integration graph function mode has been performed by pushing a [∫dx] key, that is, a [SHIFT]+[F5] key of the key input device 11 (step S128). Here, when the selection operation of the integration graph function mode is determined to have been performed, the CPU 13 proceeds to a process of step S144 which will be described later.

On the other hand, when the selection operation of the integration graph function mode is determined to have not been performed, the CPU 13 further determines whether or not the operation of the menu key (the [MENU] key) has been performed (step S129). Here, when the operation of the menu key is determined to have been performed, the CPU 13 returns to the process of step S102.

On the other hand, when the operation of the menu key is determined to have not been performed, the CPU 13 determines whether or not a selection operation of another function mode has been performed (step S130). Here, when the selection operation of another function mode is determined to have not been performed, the CPU 13 returns to the process of step S126.

On the other hand, when the selection operation of another function mode is determined to have been performed, the CPU 13 executes a process of the selected function mode. For example, when a return operation such as a operation of an [EXIT] key is performed, the CPU 13 returns to the process of step S115.

Figure 6C:
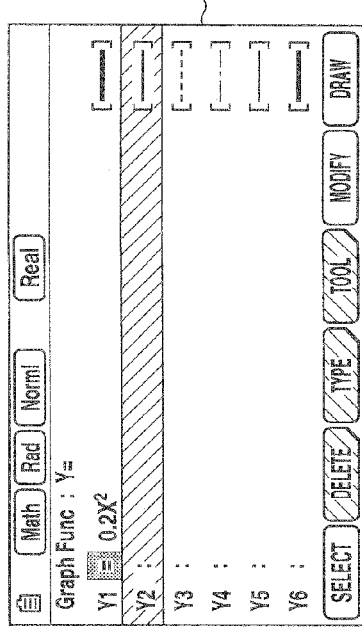
Figure 6D:
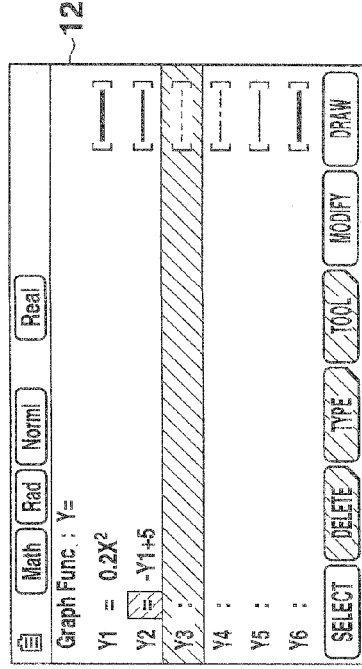

As a result, in step S123, for example, as illustrated in FIG. 6C, it is possible to further designate another graph number (for example, Y2), input formula data (for example, Y2=−Y1+5) of the graph formula (Y2), and set the graph formula as the display target. In the example of FIG. 6C, through the operation of the [F1] key (the select key), the graph formula Y1 is excluded from the display target, and the graph formula Y2 is newly set as the display target. Thus, in this case, in step S125, the graph image of the graph formula Y2 citing the graph formula Y1 is displayed and output as illustrated in FIG. 6D. At the time of the graph image display output, the graph formula 121 corresponding to the graph image is also displayed and output.

Further, when the [QR] key is determined to have been pushed in step S126, the CPU 13 reads the server address, the type code, the selected function mode (for example, a graph mode-graph image display function mode), the setup data, the view window data, the formula data of the display target ("Y2=−Y1+5" in the example of FIG. 6C) from the memory 14, and temporarily saves the read information in the work area 148 of the memory 14 as the bar code content data (the QR data) (step S131).

Figure 7:
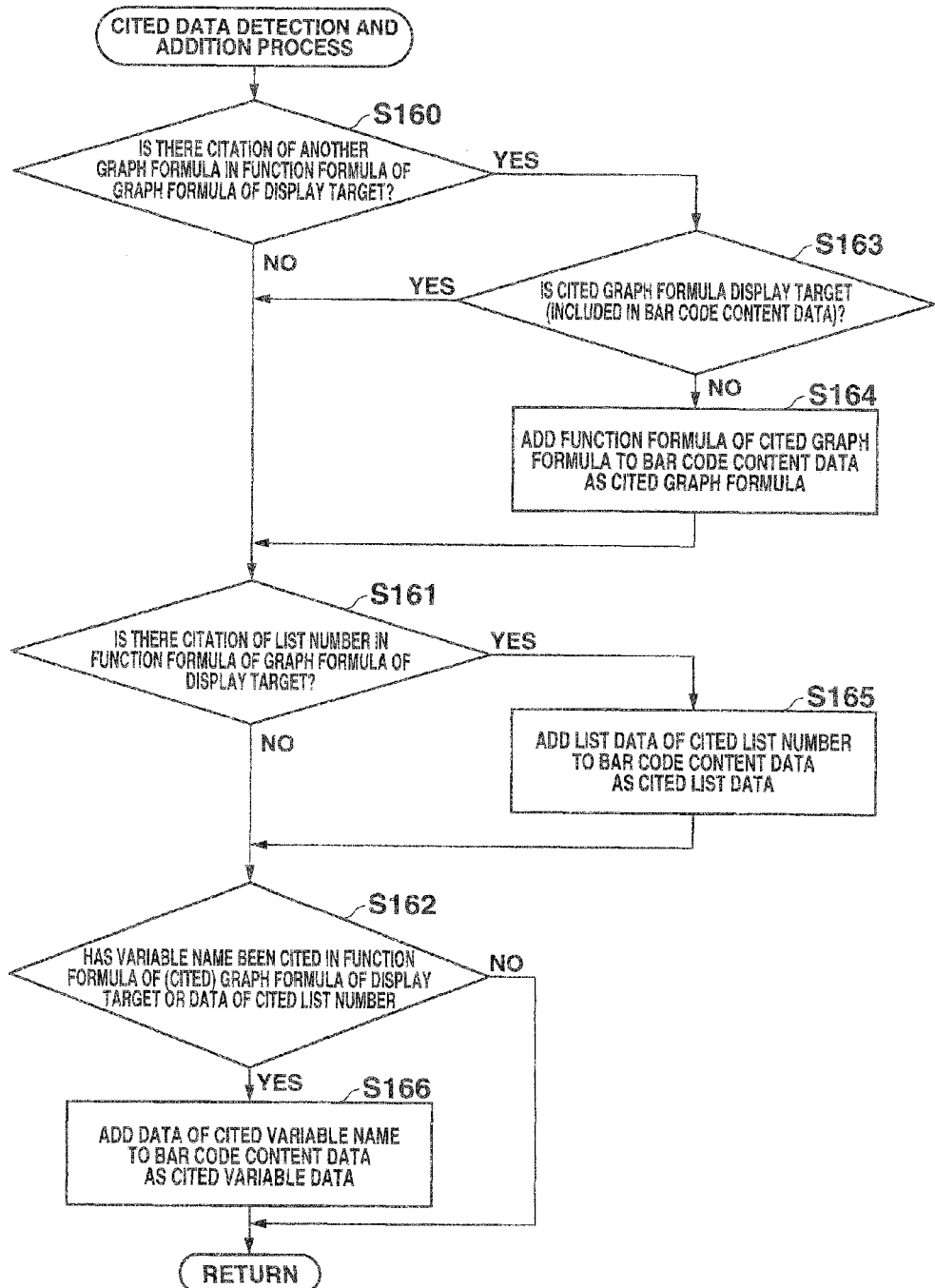
FIG. 7 is a diagram illustrating a flowchart of cited data detection and an addition process in FIGS. 4C and 4D.

Thereafter, cited data detection and an addition process are executed (step S132). FIG. 7 illustrates the details of the cited data detection and the addition process.

First, the CPU 13 determines whether or not there is a citation of another graph formula in the formula data of the display target of the graph formula (step S160). Here, when there is determined to be a citation of another graph 10, formula, the CPU 13 proceeds to a process of step S163 which will be described later.

On the other hand, when there is determined to be no citation of another graph formula, the CPU 13 further determines whether or not there is a citation of a list number in the formula data of the display target of the graph formula (step S161). Here, when there is determined to be a citation of the list number, the CPU 13 proceeds to a process of step S165 which will be described later.

On the other hand, when there is determined to be no citation of the list number, the CPU 13 further determines whether or not a variable (variable name) has been cited in the formula data of the display target (or cited) graph formula or data of the cited list number (step S162). Here, when the variable name is determined to have been cited, the CPU 13 proceeds to a process of step S166 which will be described later.

On the other hand, when the variable name is determined to have not been cited, the CPU 13 returns to a high-order routine.

Thus, if the graph formula Y1 is designated as the display target, since there is none of a citation of another graph formula, a citation of the list number, and a citation of the variable name, nothing is performed in the cited data detection and the addition process of step S132.

On the other hand, when the graph formula Y2 is designated as the display target, since another graph formula Y1 is cited, in step S160, there is determined to be a citation of another graph formula. In this case, the CPU 13 determines whether or not the cited graph formula is the display target (included in the bar code content data) (step S163). Here, when the cited graph formula is determined to be the display target, the CPU 13 returns to the process of step S161.

On the other hand, when the cited graph formula (Y1) is determined to be not the display target, the CPU 13 adds the formula data (Y1=0.2X$^2$) of the cited graph formula number (Y1) to the bar code content data being temporarily stored in the work area 148 as a cited graph formula (step S164). Thereafter, the CPU 13 returns to the process of step S161.

When the cited data detection and the addition process are performed, the CPU 13 converts the bar code content data being temporarily stored in the work area 148 into a 2D bar code (a QR code), and causes a 2D bar code image (QR image) to be displayed and output on the display output device 12 (step S133).

Figure 8B:
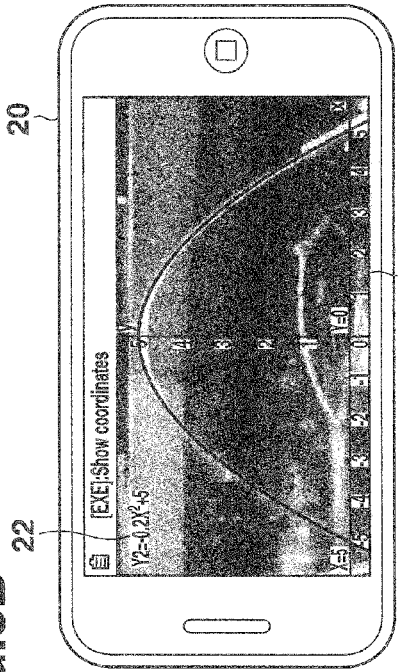
FIG. 8B is a diagram illustrating exemplary display of a graph image generated by a calculation server in an external device.
Figure 8D:
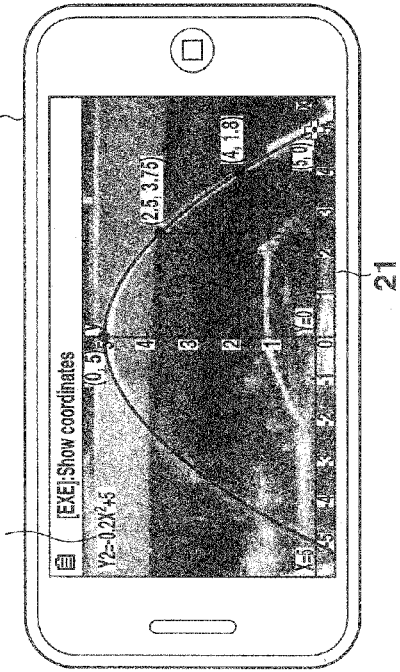
FIG. 8D is a diagram illustrating exemplary display of a graph image generated by a calculation server in an external device, corresponding to FIG. 8C.
Figure 8A:
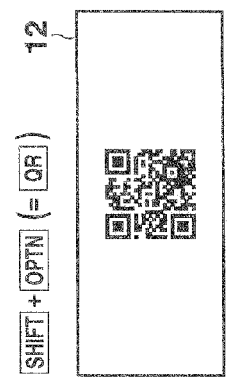
FIG. 8A is a diagram illustrating an exemplary display screen when a QR key is operated in a graph function calculator.

As a result, the 2D bar code (the QR code) is displayed and output on the display output device 12 as illustrated in FIG. 8A. Further, when only the graph formula Y2 is set as the display target, the bar code content data of the 2D bar code (the QR code) includes the formula data (Y1=0.2X$^2$) of the cited graph formula (Y1) added by the cited data detection and the addition process of step S132 in addition to the server address, the type code, the selected function mode (the graph mode-graph image display function mode), the setup data, the view window data, and the formula data (Y2=−Y1+5) of the display target which are read from the memory 14.

As illustrated in FIG. 1, the camera-equipped communication device 20 photographs the 2D bar code image (QR image) displayed and output on the display output device 12 of the graph function calculator 10, and transmits the bar code content data (the QR data) to the calculation server 40 indicated by the server address included in the bar code content data via the communication network 30.

FIG. 9 is a flowchart illustrating the received data support process of the calculation server 40 that receives the transmitted bar code content data. In other words, when it is determined that the communication device 45 has received data via the communication network 30 in a process of a high-order routine (not illustrated), the CPU 41 of the calculation server 40 starts the received data support process.

First, the CPU 41 determines whether or not data has been received by a 2D bar code operation in the camera-equipped communication device 20 such as the tablet or the smartphone (step S401). Here, when data is determined to have been received by the 2D bar code operation, the CPU 41 proceeds to a process of step S404 which will be described later.

On the other hand, when no data is determined to have been received by the 2D bar code operation, the CPU 41 further determines whether or not image data has been received by the camera-equipped communication device 20 such as the tablet or the smartphone (step S402). When no image data is determined to have been received, the CPU 41 proceeds to another process.

On the other hand, when image data is determined to have been received, the CPU 41 holds the received image in the image file data memory 422 of the memory 42, and initially sets the received image as the background image of the camera-equipped communication device 20 (step S403). Thereafter, the CPU 41 returns to a high-order routine.

On the other hand, when data is determined to have been received by the 2D bar code operation in step S401, the CPU 41 temporarily saves the received bar code content data in the received data saving area 423 of the memory 42 (step S404). Then, it is determined whether or not the type code included in the temporarily saved bar code content data is a type code of a graph type (step S405). Here, when the type code included in the temporarily saved bar code content data is determined to be not the type code of the graph type, the CPU 41 proceeds to a process of a non-graph type.

On the other hand, when the type code included in the temporarily saved bar code content data is determined to be the type code of the graph type, the CPU 41 determines whether or not the selected function mode included in the temporarily saved bar code content data is the graph image display function mode (step S406). Here, when the selected function mode included in the temporarily saved bar code content data is determined to be the graph image display function mode, the CPU 41 proceeds to a process of step S409 which will be described later.

On the other hand, when the selected function mode included in the temporarily saved bar code content data is determined to be not the graph image display function mode, the CPU 41 further determines whether or not the selected function mode included in the temporarily saved bar code content data is the trace function mode (step S407). Here, when the selected function mode included in the temporarily saved bar code content data is determined to be the trace function mode, the CPU 41 proceeds to a process of step S411 which will be described later.

On the other hand, when the selected function mode included in the temporarily held bar code content data is determined to be not the trace function mode, the CPU 41 further determines whether or not the selected function mode included in the temporarily saved bar code content data is the integration graph function mode (step S408). Here, when the selected function mode included in the temporarily saved bar code content data is determined to be the integration graph function mode, the CPU 41 proceeds to a process of step S413 which will be described later.

On the other hand, when the selected function mode included in the temporarily saved bar code content data is determined to be not the integration graph function mode, the CPU 41 proceeds to a process of another function mode.

Figure 10:
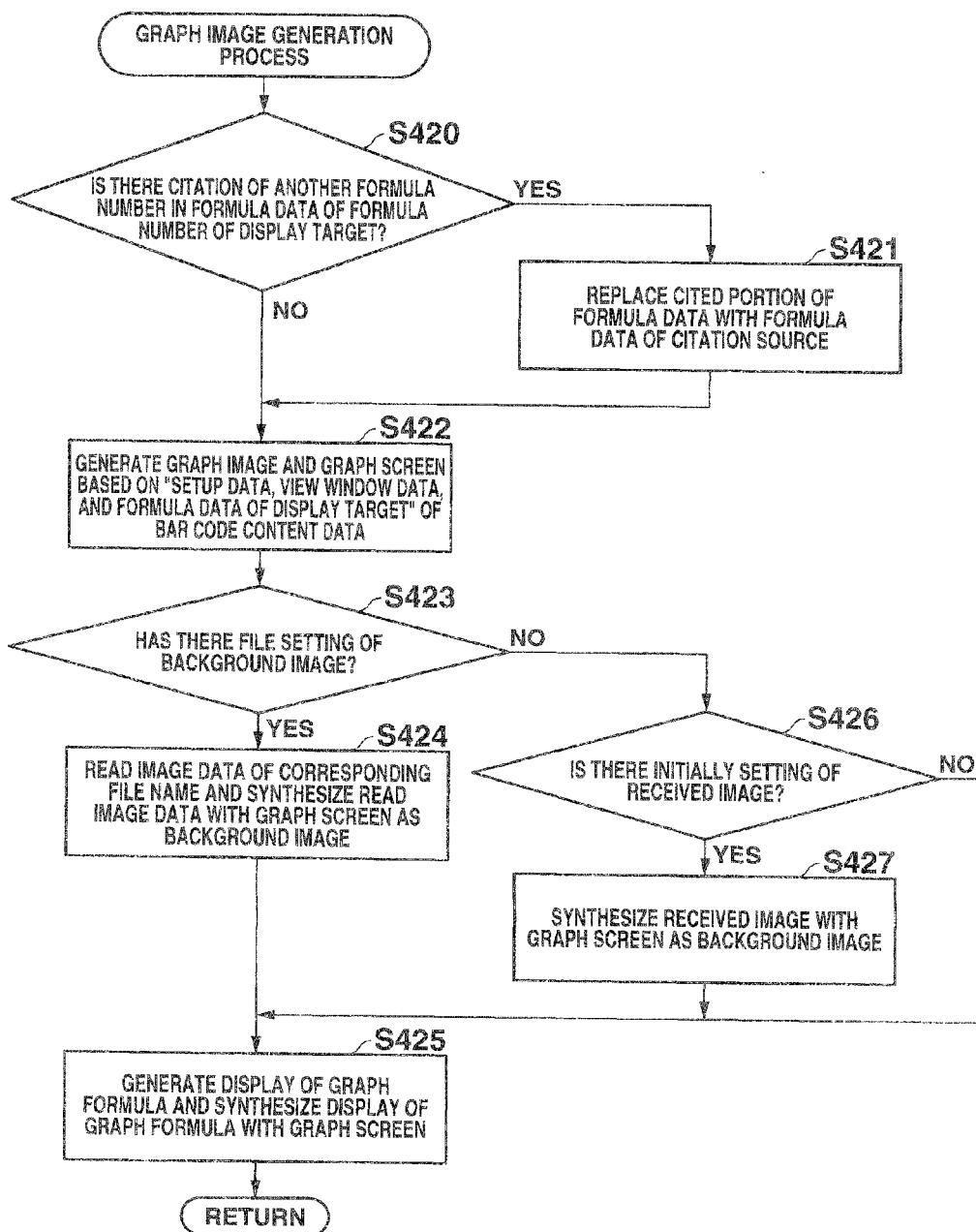
FIG. 10 is a diagram illustrating a flowchart of a graph image generation process in FIG. 9.

In the above-described example, when the bar code content data includes the graph image display function mode, the function mode is determined to be the graph image display function mode in step S406. In this case, the CPU 41 executes a graph image generation process (step S409). FIG. 10 illustrates the details of the graph image generation process.

In other words, the CPU 41 first determines whether or not there is a citation of another graph formula in the formula data of the display target of the graph formula (step S420). Here, when there is determined to be no citation of another graph formula, the CPU 41 proceeds to a process of step S422 which will be described later. On the other hand, when there is determined to be a citation of another graph formula (for example, Y1) in the formula data (for example, Y2=−Y1+5) of the graph formula (for example, Y2) of the display target, the CPU 41 replaces a cited portion of the graph formula with formula data of a citation source (step S421). In other words, the formula data (Y1=0.2X$^2$) of the cited graph formula (Y1) included in the bar code content data temporarily saved in the received data holding area is substituted into the formula data (Y2=−Y1+5) of the graph formula (Y2) of the display target. Then, the formula data of the display target in the bar code content data temporarily saved in the received data saving area 423 is updated to the obtained formula data (Y2=−0.2X$^2$+5) and then held.

Then, the CPU 41 generates a graph image and a graph screen based on the setup data, the view window data, and the formula data of the display target of the bar code content data temporarily saved in the received data saving area 423 (step S422). Thereafter, the CPU 41 determines whether or not there is a background image file setting in the setup data (step S423). Here, when there is determined to be no background image file setting, the CPU 41 proceeds to a process of step S426 which will be described later.

On the other hand, when there is determined to be the background image file setting, the CPU 41 reads image data of each file name from the image file data memory 422, and synthesizes the image data with the graph screen as the background image (step S424). Then, a display (Y2=−0.2X$^2$+5) of the graph formula to be displayed together with the graph image is generated, and the generated display is synthesized with the graph screen generated in step S422 (step S425). Thereafter, the CPU 41 returns to a high-order routine.

After the graph image generation process is executed, the CPU 41 transmits image data of the generated graph screen to the camera-equipped communication device 20 such as the smartphone via the communication network 30 through the communication device 45 (step S410). Thereafter, the CPU 41 returns to a high-order routine.

The camera-equipped communication device 20 such as the smartphone that has received the image data of the graph screen generated by the calculation server 40 can cause the received graph screen to be displayed on the display output device 21 as illustrated in FIG. 8B. In the graph screen, rather than "Y2=−Y1+5" of the graph formula 121 illustrated in FIG. 6D, "Y2=−0.2X$^2$+5" is displayed as a display 22 of the graph formula replaced by the substitution of the formula data (Y1=0.2X$^2$) of the graph formula (Y1) of the citation source.

Figure 8C:
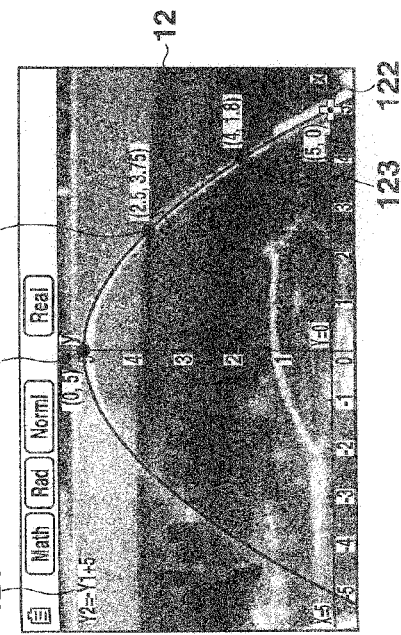
FIG. 8C is a diagram illustrating an exemplary graph formula input screen when a trace function of a graph function calculator is executed.

Further, when the selection operation of the trace function mode is determined to have been performed in step S127, the CPU 13 displays a trace pointer 122 on the graph of the graph image displayed and output on the display output device 12, for example, at a point on the y axis as illustrated in FIG. 8C, and displays a coordinate value (for example, (0, 5)) of the trace pointer 122 (step S134). Then, the CPU 13 displays the trace pointer 122 to move along the graph according to the horizontal operation of the cursor key 114 by the user (step S135). Thereafter, the CPU 13 determines whether or not the operation of the [EXE] key (the execution key) has been performed (step S136). Here, when the operation of the execution key is determined to have not been performed, the CPU 13 returns to the process of step S135.

On the other hand, when the execution key is determined to have been operated, the CPU 13 writes a current coordinate value (for example, (2.5, 3.75)) of the trace pointer 122 on the graph (step S137). Thereafter, the CPU 13 determines whether or not the [QR] key has been pushed (step S138). Here, when the [QR] key is determined to have been pushed, the CPU 13 proceeds to a process of step S140 which will be described later. On the other hand, when the [QR] key is determined to have not been pushed, the CPU 13 further determines whether or not the return operation such as the [EXIT] key operation has been performed (step S139). Here, when the return operation is determined to have been performed, the CPU 13 returns to the process of step S126. Further, when the return operation is determined to have not been performed, the CPU 13 returns to the process of step S135.

On the other hand, when the [QR] key is determined to have been pushed in step S138, the CPU 13 reads the server address, the type code, the selected function mode (for example, graph mode-the trace function mode), the setup data, the view window data, and the formula data ("Y2=−Y1+5" in the example of FIG. 8C) of the display target from the memory 14, and temporarily saves the read information in the work area 148 of the memory 14 as the bar code content data (the QR data) (step S140).

Then, the CPU 13 adds the current coordinate value (for example, (x,y)=(5,0)) of the trace pointer 122 and the coordinate values (for example, (x,y)=(0,5), (2.5,3.75), and (4,1.8), (5,0)) written on the graph to the bar code content data temporarily saved in the work area 148 as result data of the plot function (step S141).

Thereafter, the CPU 13 executes the cited data detection and the addition process (step S142). In the cited data detection and the addition process of step S142, the same process as step S132 is performed.

Then, when the cited data detection and the addition process end, the CPU 13 converts the bar code content data being temporarily stored in the work area 148 into the 2D bar code (the QR code), and causes the 2D bar code image (QR image) to be displayed and output on the display output device 12 (step S143). As a result, the bar code content data of the 2D bar code (the QR code) to be displayed and output on the display output device 12 also includes the formula data (Y1=0.2X$^2$) of the cited graph formula (Y1) added by the cited data detection and the addition process of step S142 in addition to the server address, the type code, the selected function mode (graph mode-the trace function mode), the setup data, the view window data, and the formula data (Y2=−Y1+5) of the display target which are read from the memory 14, and the result data (the current coordinate value (x,y)=(5,0)) of the trace pointer 122 and the coordinate values ((x,y)=(0,5), (2.5,3.75), (4,1.8), (5,0)) written on the graph) of the plot function.

Thereafter, the CPU 13 returns to the process of step S139.

On the other hand, when the bar code content data is received, in the calculation server 40 deter, in step S407, the CPU 41 determines that the selected function mode included in the bar code content data temporarily held in the received data saving area 423 of the memory 42 is the trace function mode. In this case, the CPU 41 executes the graph image generation process (step S411). In the graph image generation process of step S411, the same process as step S409 is performed.

Then, when the graph image generation process ends, the CPU 41 synthesizes the graph formula "Y2=−0.2X$^2$+5," the current coordinate value "X=5 Y=0" of the trace pointer, the respective coordinate value ((x,y)=(0,5), (2.5,3.75), (4,1.8), (5,0)), and the plot point with the graph screen (step S412). Thereafter, the CPU 41 returns to the process of step S410, and transmits the image data of the generated graph screen to the camera-equipped communication device 20 such as the smartphone via the communication network 30 through the communication device 45.

Thus, the camera-equipped communication device 20 such as the smartphone that has received the image data of the graph screen generated by the calculation server 40 can display the received graph screen through the display output device 21 as illustrated in FIG. 8I). In the graph screen, rather than "Y2=−Y1+5" of the graph formula 121 illustrated in FIG. 8C, the graph formula "Y2=−0.2X$^2$+5" by the substitution of the formula data (Y1=0.2X$^2$) of the graph formula (Y1) of the citation source, the current coordinate value "X=5 Y=0" of the trace pointer, the respective coordinate values ((x,y)=(0,5), (2.5,3.75), (4,1.8), (5,0)), and the plot point are synthesized with the graph screen and displayed.

On the other hand, when the selection operation of the integration graph function mode is determined to have been performed in step S128, the CPU 13 displays the pointer on the graph image displayed and output on the display output device 12, designates a lower limit value of an integration range by the user operation (step S144), and designates an upper limit value of the integration range by the user operation (step S145). As illustrated in FIG. 11A, the designating is decided from the coordinates of the pointer 123 when the pointer 123 is displayed, the pointer 123 is moved according to the operation of the cursor key 114 performed by the user, and then the operation of the [EXE] key (the execution key) is performed. The designated integration range is stored in the input data area 145 of the memory 14.

Figure 11B:
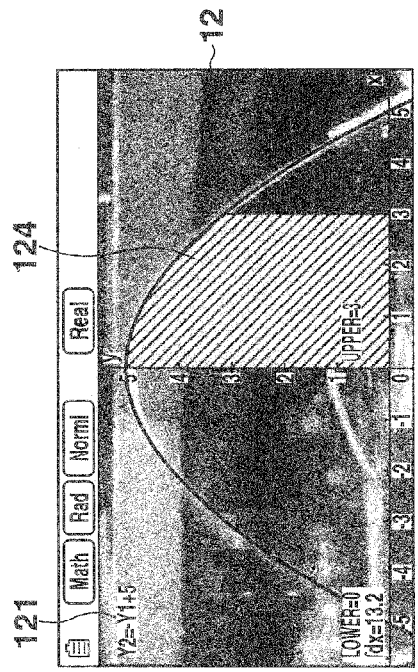
FIG. 11B is a diagram illustrating exemplary identification display of an integration area corresponding to FIG. 11A.

When the operation of the [EXE] key (the execution key) for designating the upper limit value is performed, the CPU 13 executes an integration calculation in the designated integration range (for example, 0 to 3), displays an resultant integral value (for example, ∫dx=13.2), and identifies and marks an integration area as illustrated in FIG. 11B (step S146).

Thereafter, the CPU 13 determines whether or not the [QR] key has been pushed (step S147). Here, when the [QR] key is determined to have been pushed, the CPU 13 proceeds to a process of step S149 which will be described later. On the other hand, when the [QR] key is determined to have not been pushed, the CPU 13 further determines whether or not the return operation such as the [EXIT] key operation has been performed (step S148). Here, when the operation is determined to have been performed, the CPU 13 returns to the process of step S144. Further, when the return operation is determined to have not been performed, the CPU 13 returns to the process of step S135.

On the other hand, when the [QR] key is determined to have been pushed in step S147, the CPU 13 reads the server address, the type code, the selected function mode (for example, graph mode-the integration graph function mode), the setup data, the view window data, and the formula data ("Y2=−Y1+5" in the example of FIG. 11B) of the display target from the memory 14, and temporarily holds the read information in the work area 148 of the memory 14 as the bar code content data (the QR data) (step S149).

Further, the CPU 13 adds the integration range data (for example, 0 to 3) and the integral value (for example, 13.2) to the bar code content data temporarily saved in the work area 148 as result data of the integration function (step S150).

Thereafter, the CPU 13 executes the cited data detection and the addition process (step S151). In the cited data detection and the addition process of step S151, the same process as step S132 is performed.

Figure 11D:
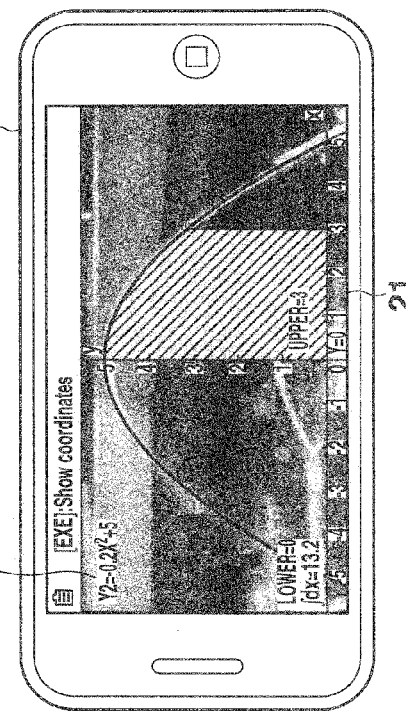
FIG. 11D is a diagram illustrating exemplary display of a graph image generated by a calculation server in an external device.
Figure 11A:
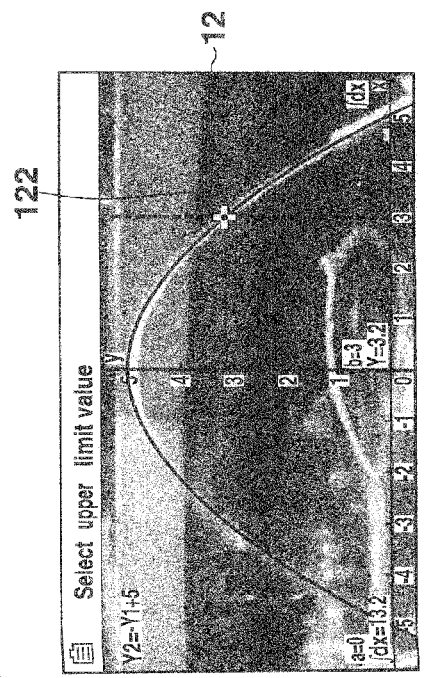
FIG. 11A is a diagram illustrating an exemplary input screen of formula data of a graph when an integration graph function of a graph function calculator is executed.
Figure 11C:
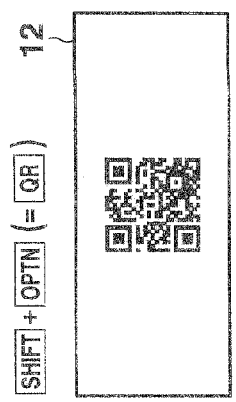
FIG. 11C is a diagram illustrating an exemplary display screen when a QR key is operated in a graph function calculator.

When the cited data detection and the addition process end, the CPU 13 converts the bar code content data being temporarily stored in the work area 148 into the 2D bar code (the QR code), and causes the 2D bar code image (QR image) to be displayed and output on the display output device 12 as illustrated in FIG. 11C (step S152). As a result, the bar code content data of the 2D bar code (the QR code) displayed and output on the display output device 12 also includes the formula data (Y1=0.2X$^2$) of the cited graph formula (Y1) added by the cited data detection and the addition process of step S151 in addition to the server address, the type code, the selected function mode (graph mode-the integration graph function mode), the setup data, the view window data, and the formula data (Y2=−Y1+5) of the display target which are read from the memory 14, and the result data (the integration range data (for example, 0 to 3) and the integral value (for example, 13.2)) of the integration function.

Thereafter, the CPU 13 returns to the process of step S148.

On the other hand, when the bar code content data has been received, in the calculation server 40, in step S408, the selected function mode included in the bar code content data temporarily held in the received data saving area 423 of the memory 42 is determined to be the integration graph function mode. In this case, the CPU 41 executes the graph image generation process (step S413). In the graph image generation process of step S411, the same process as step S409 is performed.

When the graph image generation process, the CPU 41 performs identification display of a portion corresponding to the integration range data (0 to 3), and synthesizes the lower limit value (LOWER=0), the upper limit value (UPPER=3), the formula data (the formula data of the integration target: "Y2=−Y1+5" in the example of FIG. 11B) of the display target, and the integral value (∫dx=13.2) with the graph screen (step S414). Thereafter, the CPU 41 returns to step S410, and transmits the image data of the generated graph screen to the camera-equipped communication device 20 such as the smartphone via the communication network 30 through the communication device 45.

Thus, the camera-equipped communication device 20 such as the smartphone that has received the image data of the graph screen generated by the calculation server 40 can display the received graph screen through the display output device 21 as illustrated in FIG. 11D. In the graph screen, rather than "Y2=−Y1+5" of the graph formula 121 illustrated in FIG. 11B, "Y2=−0.2X$^2$+5" is displayed as the display 22 of the graph formula by the substitution of the function formula (Y1=0.2X$^2$) of the graph formula (Y1) of the citation source. Further, identification display of the portion corresponding to the integration range data (0 to 3) is displayed, and the lower limit value (LOWER=0), the upper limit value (UPPER=3), the formula data of the display target (the formula data of the integration target: "Y2=−Y1+5" in the example of FIG. 11B), and the integral value (∫dx=13.2) are synthesized with the graph screen.

Figure 12A:
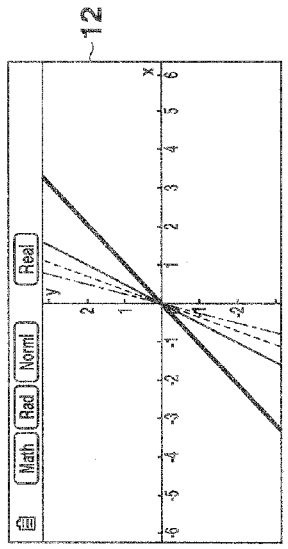
FIG. 12A is a diagram illustrating an image data acquisition screen in an external device.

The image data that is transmitted from the camera-equipped communication device 20 such as the tablet or the smartphone to the calculation server 40 in step S402 and initially set as the background image data in step S403 is the image data photographed by the camera-equipped communication device 20 as illustrated in FIG. 12A, for example.

Figure 12B:
FIGS. 12B, 12C, and 12D are diagrams illustrating an exemplary screen when a list function of a graph function calculator is executed.
Figure 12C:
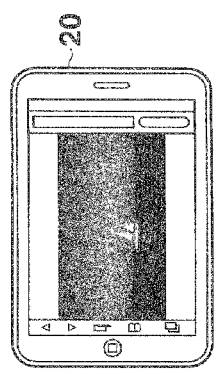
Figure 12D:
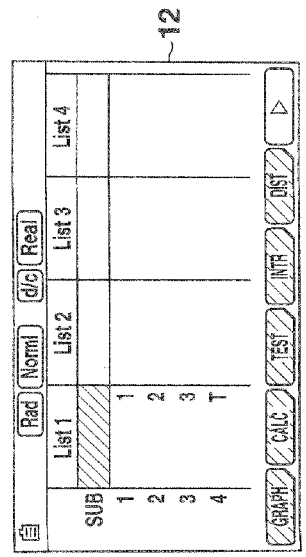

The list data input by the user operation in step S110 is illustrated in FIG. 12B. As described above, a variable can be set even to the list data. However, it is necessary to set variable data to the variable (T) in advance, for example, 4→T (T=4) in step S107 of the normal calculation function mode. At the stage at which the list data is input, in step S123, the graph formula (for example, Y1=List 1X) (or Y1=List 1×X; "×" is a multiplication) is input as illustrated in FIG. 12C. When the execution of the graph image display is instructed by the operation of the [EXE] key (the execution key) in step S124, in step S125, the CPU 13 synthesizes graph images in which ((1, 2, 3, T)) serving as data of List 1 is substituted into a List 1 portion of Y1=List 1X to be displayed and output on the display output device 12 as illustrated in FIG. 12D.

Then, when the [QR] key is determined to have been pushed in step S126, in step S131, the CPU 13 reads the server address, the type code, the selected function mode (for example, the graph mode-graph image display function mode), the setup data (in this example, the graph back ground image; [None] (no background image is displayed)), the view window data, and the formula data of the display target ("Y1=List 1X" in this case) from the memory 14, temporarily holds the read information in the work area 148 of the memory 14 as the bar code content data (the QR data), and then executes the cited data detection and the addition process of step S132.

In this case, in step S161, there is determined to be a citation of the list number in the formula data of the display target of the graph formula. Thus, in this case, the CPU 13 adds the list data (1, 2, 3, T) of the cited list number (List 1) to the bar code content data being temporarily stored in the work area 148 as the cited list data (step S165). Then, the CPU 13 proceeds to a process of step S162.

In step S162, the CPU 13 determines the variable name ("T" in this case) has been cited in the data of the cited list number. Thus, in this case, the CPU 13 adds the variable data (T=4) of the cited variable (variable name) set by the user to the bar code content data being temporarily stored in the work area 148 as the cited variable data (step S166). Then, the CPU 13 returns to a high-order routine.

Figure 12E:
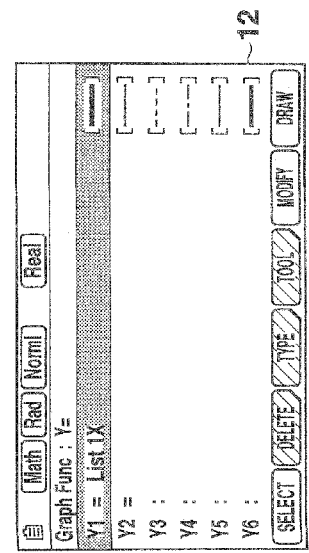
FIG. 12E is a diagram illustrating an exemplary display screen when a QR key is operated in a graph function calculator.

When the cited data detection and the addition process end, in step S133, the CPU 13 converts the bar code content data being temporarily stored in the work area 148 into the 2D bar code (the QR code). The CPU 13 causes the 2D bar code image (QR image) to be displayed and output on the display output device 12 as illustrated in FIG. 12E. As a result, the bar code content data of the 2D bar code (the QR code) displayed and output on the display output device 12 also includes the cited list data (1, 2, 3, T) added by the cited data detection and the addition process of step S132 and the cited variable data (T=4) set by the user in addition to the server address, the type code, the selected function mode (the graph mode-graph image display function mode), the setup data (the graph back ground image; [None]), the view window data, and the formula data (Y1=List 1X) of the display target which are read from the memory 14.

When the bar code content data has been received, the calculation server 40 generates the graph image in the graph image generation process of step S409, and determines that there is no background image file setting in step S423. In this case, the CPU 41 determines whether or not the received image has been initially set (step S426). Here, when the received image is determined to have not been initially set, the CPU 41 returns to the process of step S425, and synthesizes display of the graph formula as the graph screen having no background image.

Figure 12F:
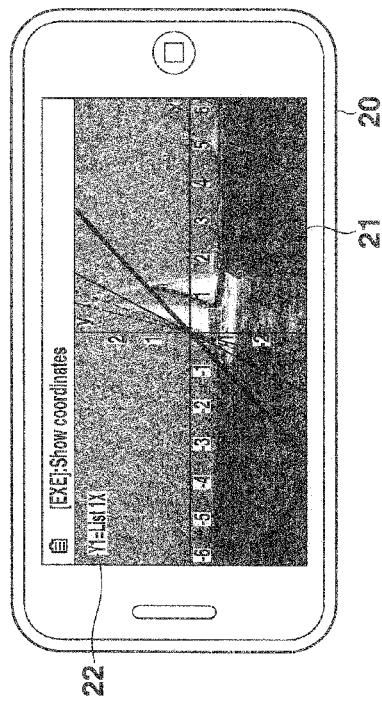
FIG. 12F is a diagram illustrating exemplary display of a graph image generated by a calculation server in an external device.

On the other hand, when the received image is determined to have been initially set, the CPU 41 synthesizes the received image with the graph screen as the background image (step S427). Then, the CPU 41 returns to the process of step S425, and synthesizes display of the graph formula with the graph screen in which the received image is set as the background image. The camera-equipped communication device 20 such as the smartphone that has received the image data of the graph screen in which the received image is set as the background image can display the received graph screen through the display output device 21 as illustrated in FIG. 12F. In the graph screen, in the initial setting, the image data photographed by the camera-equipped communication device 20 is set as the background image, and a synthetic image in which each graph image in which (1, 2, 3, T=4; variable data) serving as data of List 1 is substituted into the List 1 portion of "Y1=List 1X" is displayed.

Thus, according to the graph function calculator 10, the formula data (Y1=0.2X$^2$,Y2=−Y1+5) of a plurality of graph formulas (Y1,Y2) input by the user operation of the key input device 11 is stored in the graph formula area 146 of the memory 14. When an arbitrary graph formula (Y2) designated by the user operation among the graph formulas of a plurality of pieces of formula data is set as the display target, the CPU 13 causes the graph image of the graph formula set as the display target to be displayed on the display output device 12. Further, when the formula data of the graph formula (Y2) set as the display target cites another graph formula (Y1) among the graph formulas of the pieces of formula data, the CPU 13 extracts the formula data of another cited graph formula number. Then, the CPU 13 externally outputs the formula data of the graph formula as the display target and the formula data of another cited graph formula number, for example, through the display output device 12 so that the output the formula data can be acquired by an external device.

As a result, it is possible to appropriately set and externally output various kinds of pieces of data including the formula data of the graph formula in the graph function calculator 10 serving as the graph display device as the external output target. As a result, the external device can display the graph image corresponding to the formula data of the graph formula.

Further, it is possible to set a display range (X and Y coordinate ranges) including an upper limit value and a lower limit value of the graph image displayed on the display output device 12 in the horizontal axis (first axis) direction and the vertical axis (second axis) direction through the user operation of the key input device 11 and stores the set display range in the view window data area 143 of the memory 14. The CPU 13 displays the graph image according to the stored display range while externally outputting the display range.

As described above, it is also possible to appropriately set and externally output data related to the display range as the external output target, and the external device can display the graph image corresponding to the formula data of the graph formula in the appropriate display range.

In addition, it is possible to further set the scale width of the graph image displayed on the display output device 12 and stores the scale width of the graph image in the view window data area 143, and it is possible to set the presence or absence of display of the horizontal axis and the vertical axis of the graph image and the presence or absence of scale display of the horizontal axis and the vertical axis by the user operation of the key input device 11 and store the setting in the setup data area 144 of the memory 14. When the graph image is displayed, the CPU 13 performs the display of the horizontal axis and the vertical axis and the scale display of the horizontal axis and the vertical axis according to the setting, and externally outputs the setting related to the axis display.

As a result, it is also possible to appropriately set and externally output data related to the axis display as the external output target, and the external device can display the graph image corresponding to the formula data of the graph formula together with an appropriate axis display.

Further, it is possible to set the background image file name at the time of the graph image display by the user operation of the key input device 11 and store the set background image file name in the image file data memory 142 of the memory 14. The CPU 13 causes the background image indicated by the set background image file name to be displayed on the display output device 12 as the background image of the graph image, and externally outputs the set background image file name.

As a result, it is also possible to appropriately set and externally output the data related to the background image as the external output target, and the external device can display the graph image corresponding to the formula data of the graph formula on the appropriate background image. Further, since the image file of the background image data is not externally output, an externally output data capacity can be reduced.

Further, it is possible to input the list data by the user operation of the key input device 11 and store the input list data in the table data area 147 of the memory 14. When the formula data of the graph formula set as the display target includes a list, the CPU 13 causes the graph image to be displayed on the display output device 12 according to the stored list data, and externally outputs the stored list data.

As a result, it is also possible to appropriately set and externally output the data related to the list as the external output target, and the external device can appropriately display the graph image corresponding to the formula data of the graph formula including the list.

In this case, it is possible to set variable data of an arbitrary variable by the user operation of the key input device 11 to the input data area 145 of the memory 14. When there is a variable in the list included in the formula data, the CPU 13 causes the graph image to be displayed on the display output device 12 according to the set variable data of the variable, and externally outputs the variable data of the variable.

As a result, it is also possible to appropriately set and externally output the variable data of the variable as the external output target, and the external device can appropriately display the graph image corresponding to the formula data of the graph formula including the variable.

Further, it is possible to input a variable used as a constant in the formula data of the graph formula by the user operation of the key input device 11 and store the input variable in the input data area 145. When there is a variable in the list included in the formula data, the CPU 13 causes the graph image to be displayed on the display output device 12 according to the stored variable, and externally outputs the variable.

As a result, it is also possible to appropriately set and externally output the variable data of the variable as the external output target, and the external device can appropriately display the graph image corresponding to the formula data of the graph formula including the variable.

As a technique of externally outputting data so that the data can be acquired by the external device, data to be externally output may be converted into a 2D code, and displayed and externally output through the display output device 12.

As a result, it is unnecessary to implement a wired or wireless communication function in the graph function calculator 10 serving as the graph display device, and thus the graph function calculator 10 can be provided at a low cost.

According to the graph function calculator 10, the formula data (Y2=−Y1+5) of the graph formula (Y2) input by the user operation of the key input device 11 is stored in the graph formula area 146 of the memory 14. The CPU 13 causes the graph image of the graph formula to be displayed on the display output device 12. When the graph function (the trace function, or the integration graph function) is selected by the user operation of the key input device 11, and calculation target data of the selected graph function (a trace position: an x coordinate and an integration range) is input, The CPU 13 executes a calculation on the input calculation target data. Then, the CPU 13 causes the calculation result (a y coordinate and an integration result) to be displayed on the display output device 12 being displaying the graph image. The CPU 13 externally outputs the input formula data of the graph formula and the calculation target data according to the selected graph function, for example, through the display output device 12 so that the formula data and the calculation target data can be acquired by the external device.

As a result, it is possible to appropriately set and externally output various kinds of pieces of data including the formula data of the graph formula in the graph function calculator 10 serving as the graph display device as the external output target, and thus the external device can display the graph image corresponding to the formula data of the graph formula.

The CPU 13 externally outputs the calculation result data.

As a result, it is also possible to appropriately set and externally output the calculation result data as the external output target, and the external device can display the graph image corresponding to the formula data of the graph formula together with the appropriate calculation result. For example, there are cases in which the calculation accuracy of the graph function calculator 10 is different the calculation accuracy of the external device, and in this case, it is possible to match the calculation result of the graph function calculator 10.

The selected graph function includes the trace function, and the input calculation target data includes the coordinate value on the graph image displayed on the display output device 12.

As a result, it is also possible to appropriately set and externally output the data related to the trace function as the external output target, and the external device can appropriately display the graph image corresponding to the formula data of the graph formula.

Alternatively, the selected graph function includes the integration graph function, and the input calculation target data includes the upper limit value and the lower limit value of the integration range.

As a result, it is possible to appropriately set and externally output the data related to the integration graph function as the external output target, and the external device can appropriately display the graph image corresponding to the formula data of the graph formula.

As a technique of externally outputting data so that the data can be acquired by the external device, data to be externally output may be converted into a 2D code, and displayed and externally output through the display output device 12.

As a result, it is unnecessary to implement a wired or wireless communication function in the graph function calculator 10 serving as the graph display device, and thus the graph function calculator 10 can be provided at a low cost.

The calculation server 40 receives the formula data of the graph formula that is set as the display target and output from the graph function calculator 10 serving as the graph display device and the formula data of another cited graph formula extracted in the graph function calculator 10 when the formula data of the graph formula cites another graph formula through the communication device 45. The CPU 41 generates the graph image of the formula data of the graph formula based on the received formula data of the graph formula and the formula data of another graph formula. Then, the CPU 41 transmits the generated graph image of the formula data of the graph formula to the external device through the communication device 45.

As a result, various kinds of pieces of data including the formula data of the graph formula in the graph function calculator 10 serving as the graph display device, which is appropriately set and externally output as the external output target are received. Further, it is possible to generate the graph image corresponding to the formula data of the graph formula, transmit the generated graph image to the external device, and display the graph image through the external device.

The calculation server 40 acquires the image photographed by the external device from external device through the communication device 45, and the CPU 41 sets the acquired image as the background image, and synthesizes the acquired image with the graph image.

As a result, the external device can cause the graph image corresponding to the formula data of the graph formula to be displayed on an arbitrary background image.

The communication device 45 receives data including the formula data of the graph formula and the formula data of another graph formula which have been converted into the 2D code in the graph display device from the camera-equipped communication device 20 serving as the external device that photographs and acquires the 2D code, and transmits the generated graph image of the formula data of the graph formula to the camera-equipped communication device 20.

As a result, it is unnecessary to implement a wired or wireless communication function in the graph function calculator 10 serving as the graph display device, and thus the graph function calculator 10 can be provided at a low cost.

The calculation server 40 receives the formula data of the graph formula and the calculation target data of the graph function which are externally output from the graph function calculator 10 serving as the graph display device through the communication device 45. The CPU 41 generates the graph image of the formula data of the graph formula based on the received formula data of the graph formula and the calculation target data of the graph function, and executes a calculation on the calculation target data. Then, the CPU 41 synthesizes the calculation result with the generated graph image, and transmits the graph image of the formula data of the graph formula synthesized with the generated calculation result to the external device through the communication device 45.

As a result, it is possible to receive various kinds of pieces of data including the formula data of the graph formula in the graph function calculator 10 serving as the graph display device, which is appropriately set and externally output as the external output target, generate the graph image corresponding to the formula data of the graph formula, transmit the generated graph image to the external device, and display the graph image through the external device.

The communication device 45 receives data including the formula data of the graph formula and the formula data of another graph formula which have been converted into the 2D code in the graph display device from the camera-equipped communication device 20 serving as the external device that photographs and acquires the 2D code. Then, the communication device 45 transmits the generated graph image of the formula data of the graph formula to the camera-equipped communication device 20.

As a result, it is unnecessary to implement a wired or wireless communication function in the graph function calculator 10 serving as the graph display device, and thus the graph function calculator 10 can be provided at a low cost.

Further, the externally outputting of various kinds of pieces of data including the formula data of the graph formula from the graph function calculator 10 serving as the graph display device to the external device is not limited to display output performed by the display output device 12 and may be performed by wireless output performed by the wireless communication device 16 as indicated by a broken line in FIG. 2. In this case, the camera-equipped communication device 20 receives kinds of pieces of data including the formula data of the graph formula which are externally output through an internal wireless communication device (not illustrated), and transmits the received data to the calculation server 40 via the communication network 30.

Second Embodiment

The above description has been made in connection with the example in which the graph image is generated by the calculation server 40, but the present invention is not limited to this example. In other words, the function of the calculation server 40 may be provided in the form of an application that can be implemented in an external device using external data output from the graph function calculator 10, for example, the camera-equipped communication device 20 such as the smartphone.

Figure 13:
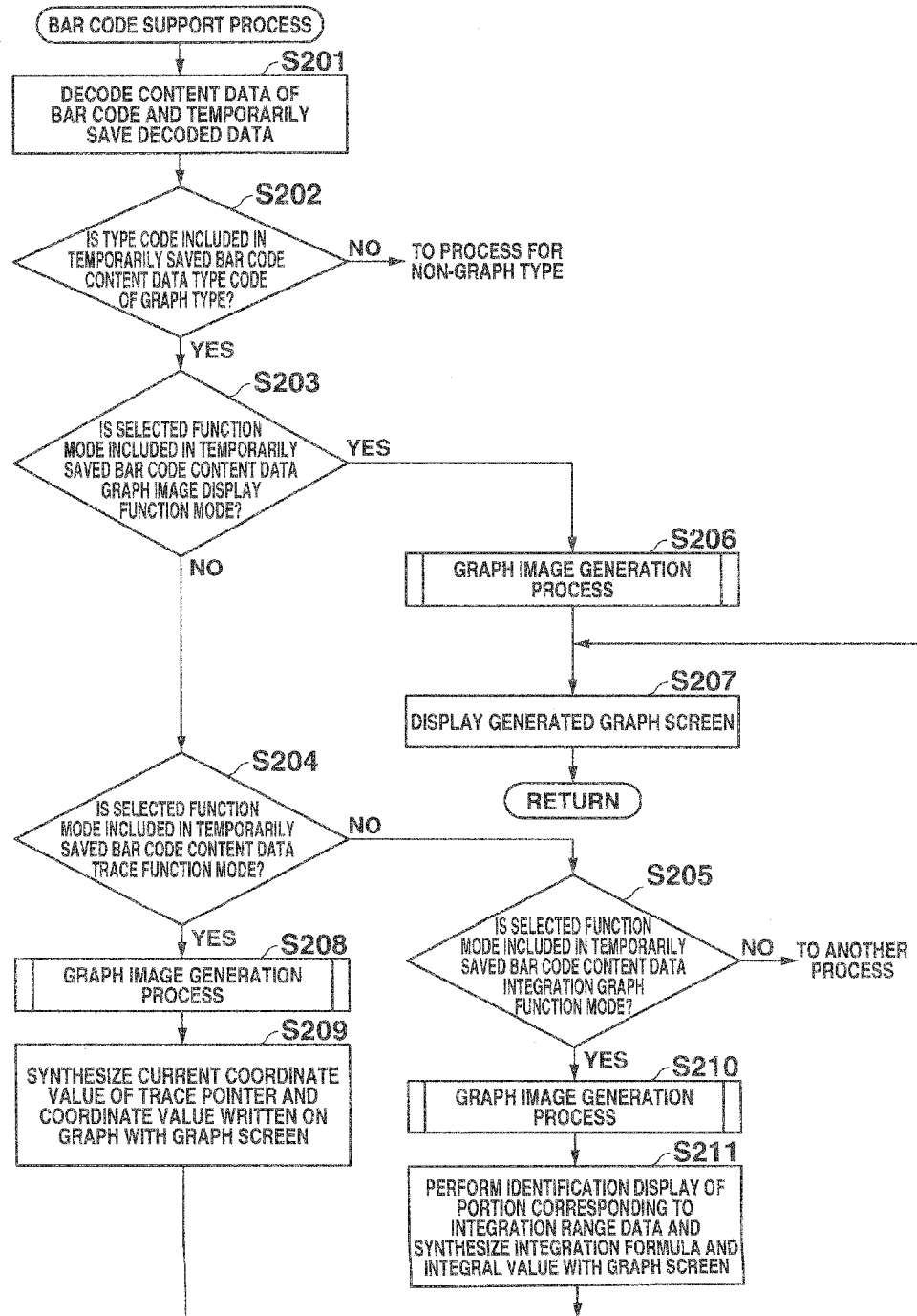
FIG. 13 is a diagram illustrating a flowchart of a bar code support process of an external device according to a second embodiment of the present invention.

FIG. 13 is a diagram illustrating a flowchart of a bar code support process of an external device according to a second embodiment of the present invention. In other words, in the camera-equipped communication device 20 serving as the external device, a CPU (not illustrated) executes an operation according to the flowchart, for example, when the 2D bar code displayed and output by the graph function calculator 10 is photographed by a camera.

First, the CPU decodes bar code content data of the photographed 2D bar code, and temporarily saves the decoded bar code content data in an internal memory (not illustrated) (step S201). Then, the CPU determines whether or not a type code included in the temporarily saved bar code content data is the type code of the graph type (step S202). Here, when the type code included in the temporarily saved bar code content data is determined to be not the type code of the graph type, the CPU proceeds to a process for a non-graph type.

On the other hand, when the type code included in the temporarily saved bar code content data is determined to be the type code of the graph type, the CPU determines whether or not the selected function mode included in the temporarily saved bar code content data is the graph image display function mode (step S203). Here, when the selected function mode included in the temporarily saved bar code content data is determined to be the graph image display function mode, the CPU proceeds to a process of step S206 which will be described later.

On the other hand, when the selected function mode included in the temporarily saved bar code content data is determined to be not the graph image display function mode, the CPU further determines whether or not the selected function mode included in the temporarily saved bar code content data is the trace function mode (step S204). Here, when the selected function mode included in the temporarily saved bar code content data is determined to be the trace function mode, the CPU proceeds to a process of step S208 which will be described later.

On the other hand, when the selected function mode included in the temporarily saved bar code content data is determined to be not the trace function mode, the CPU further determines whether or not the selected function mode included in the temporarily saved bar code content data is the integration graph function mode (step S205). Here, when the selected function mode included in the temporarily saved bar code content data is determined to be the integration graph function mode, the CPU proceeds to a process of step S210 which will be described later.

On the other hand, when the selected function mode included in the temporarily saved bar code content data is determined to be not the integration graph function mode, the CPU proceeds to a process of another function mode.

Then, when the selected function mode included in the temporarily saved bar code content data is determined to be the graph image display function mode in step S203, the CPU executes the graph image generation process (step S206). Since the graph image generation process is the same as that in calculation server, and a detailed description thereof is omitted. After executing the graph image generation process, the CPU causes the image data of the generated graph screen to be displayed and output on the display output device 21 (step S207). Thereafter, CPU returns to a high-order routine.

On the other hand, when the selected function mode included in the temporarily saved bar code content data is determined to be the trace function mode in step S204, the CPU executes the graph image generation process (step S208). Then, the current coordinate value of the trace pointer and the coordinate value written on the graph are synthesized with the graph screen (step S209). Thereafter, the CPU returns to the process of step S207, and causes the image data of the generated graph screen to be displayed and output on the display output device 21.

Further, when the selected function mode included in the temporarily saved bar code content data is determined to be the integration graph function mode in step S205, the CPU executes the graph image generation process (step S210). Then, the identification display of the portion corresponding to the integration range data is performed, and the integration formula and the integral value are synthesized with the graph screen (step S211). Thereafter, the CPU returns to the process of step S207, and causes the image data of the generated graph screen to be displayed and output on the display output device 21.

Further, the externally outputting of various kinds of pieces of data including the formula data of the graph formula from the graph function calculator 10 serving as the graph display device to the external device is not limited to display output performed by the display output device 12 and may be performed by wireless output performed by the wireless communication device 16 as indicated by a broken line in FIG. 2. In this case, the camera-equipped communication device 20 receives and processes kinds of pieces of data including the formula data of the graph formula which are externally output through an internal wireless communication device (not illustrated).

The techniques of the processes performed by the graph function calculator 10 and the graph function calculator described in the above embodiments, that is, the techniques such as the display control process described in the flowcharts of FIGS. 4A to 4D and the cited data detection and the addition process described in the flowchart of FIG. 7 may be stored in an outside device recording medium (M) such as a memory card (a ROM card, a RAM card, or the like), a magnetic disk (a floppy (a registered trademark) disk, a hard disk, or the like), an optical disk (a CD-ROM, a DVD, or the like), or a semiconductor memory as a program that can be executed by any computer and distributed.

The techniques of the processes performed by the calculation server 40 described in the above embodiments, that is, the techniques such as the received data support process described in the flowchart of FIG. 9 and the graph image generation process described in the flowchart of FIG. 10 may be stored in a recording medium (43) such as a memory card (a ROM card, a RAM card, or the like), a magnetic disk (a floppy disk, a hard disk, or the like), an optical disk (a CD-ROM, a DVD, or the like), or a semiconductor memory as a program that can be executed by any computer and distributed. Further, data of the program for implementing the respective techniques may be transmitted via the communication network 30 in the form of a program code, the program data may be taken into a computer of an electronic device connected to the communication network 30 through by a communication device (45), and the above-described server function may be implemented.

The present invention is not limited to the above embodiments, and at the implementation stage, various modifications can be made within the scope not departing from the gist thereof. Further, inventions of various stages are included in the above embodiments, and various inventions may be extracted by an appropriate combination of a plurality of disclosed elements. For example, although several elements may be deleted from all elements described in the embodiments or several elements are combined in a different form, when the problem described in PROBLEMS TO BE SOLVED BY THE INVENTION can be solved, and the effect described in EFFECTS OF THE INVENTION is obtained, a configuration in which the elements are deleted or combined may be extracted as the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An electronic device, comprising:
a display; and
a processor, the processor being configured to:
display on the display a function formula of an independent variable in which a first variable is a dependent variable, and a function formula of an independent variable in which a second variable is a dependent variable;
set a certain function formula as an output target from among the displayed function formulas according to a user operation;
determine whether or not a dependent variable other than the dependent variable of the set function formula is included in the function formula set as the output target;
when a dependent variable other than the dependent variable of the set function formula is included in the function formula set as the output target, output a function formula of the dependent variable other than the dependent variable of the set function formula and the function formula set as the output target to an external device by converting the function formula of the dependent variable other than the dependent variable of the set function formula and the function formula set as the output target into a 2D barcode, and displaying and outputting the 2D barcode;
accept input list data according to a user operation;
determine whether or not a citation to the list data is included in the function formula set as the output target; and
when a citation to the list data is included in the function formula set as the output target, output the list data corresponding to the citation and the function formula set as the output target to the external device by converting the list data corresponding to the citation and the function formula set as the output target into a 2D barcode, and displaying and outputting the 2D barcode.

2. The electronic device according to claim 1, wherein the processor is further configured to:
  determine whether or not the function formula of the dependent variable other than the dependent variable of the set function formula is set as an output target when the dependent variable other than the dependent variable of the set function formula is determined as being included in the function formula set as the output target, wherein:
  the outputting to the external device includes outputting the function formula of the dependent variable other than the dependent variable of the set function formula to the external device as a cited function formula, together with the function formula set as the output target, when the function formula of the dependent variable other than the dependent variable of the set function formula is determined as not being set as the output target, and
  the outputting to the external device includes outputting both the function formula of the dependent variable other than the dependent variable of the set function formula and the set function formula to the external device as the output target, when the function formula of the dependent variable other than the dependent variable of the set function formula is determined as being set as the output target.

3. The electronic device according to claim 1, wherein the processor is further configured to:
  determine whether or not a variable name to which a numerical value data is associated is included in the function formula set as the output target; and
  when the variable name is determined as being included, output the numerical value data associated to the variable name to the external device together with the function formula set as the output target.

4. The electronic device according to claim 1, further comprising:
  a memory that stores display range data including an upper limit value and a lower limit value in a horizontal axis direction and a vertical axis direction of a graph image to be displayed on the display,
  wherein the processor is further configured to:
  display the graph image on the display in accordance with the display range data stored in the memory; and
  output data including the display range data stored in the memory to the external device.

5. The electronic device according to claim 1, wherein the processor is further configured to:
  when the dependent variable other than the dependent variable of the set function formula is determined as being included in the function formula set as the output target, display on the display a graph image of a function formula obtained by substituting the function formula of the dependent variable other than the dependent variable of the set function formula into the set function formula.

6. The electronic device according to claim 5, wherein the processor is further configured to:
  set a background image file name when displaying the graph image on the display in accordance with a user operation;
  display a background image indicated by the set background image file name on the display as a background image of the graph image; and
  output data including the set background image file name to the external device.

7. The electronic device according to claim 5, wherein the processor is further configured to:
  when formula data set as the output target includes the citation to the list data, display on the display the graph image in accordance with the input list data.

8. The electronic device according to claim 5, wherein the processor is further configured to:
  execute a variable setting of setting a variable value of a certain variable through a user operation;
  when there is a variable of the set variable value in formula data set as an output target, display the graph image on the display device according to the set variable value; and
  output data including data of a variable value set by the variable setting to the external device.

9. A data output method in an electronic device including a display, the method comprising:
  displaying on the display a function formula of an independent variable in which a first variable is a dependent variable, and a function formula of an independent variable in which a second variable is a dependent variable;
  setting a certain function formula as an output target from among the displayed function formulas according to a user operation;
  determining whether or not a dependent variable other than the dependent variable of the set function formula is included in the function formula set as the output target;
  when a dependent variable other than the dependent variable of the set function formula is included in the function formula set as the output target, outputting a function formula of the dependent variable other than the dependent variable of the set function formula and the function formula set as the output target to an external device by converting the function formula of the dependent variable other than the dependent variable of the set function formula and the function formula set as the output target into a 2D barcode, and displaying and outputting the 2D barcode;
  accepting input list data according to a user operation;
  determining whether or not a citation to the list data is included in the function formula set as the output target; and
  when a citation to the list data is included in the function formula set as the output target, outputting the list data corresponding to the citation and the function formula set as the output target to the external device by converting the list data corresponding to the citation and the function formula set as the output target into a 2D barcode, and displaying and outputting the 2D barcode.

10. The method according to claim 9, further comprising:
  determining whether or not the function formula of the dependent variable other than the dependent variable of the set function formula is set as an output target when the dependent variable other than the dependent variable of the set function formula is determined as being included in the function formula set as the output target, wherein:
  the outputting to the external device includes outputting the function formula of the dependent variable other than the dependent variable of the set function formula to the external device as a cited function formula, together with the function formula set as the output target, when the function formula of the dependent variable other than the dependent variable of the set function formula is determined as not being set as the output target, and the outputting to the external device includes outputting both the function formula of the dependent variable other than the dependent variable of the set function formula and the set function formula to the external device as the output target, when the function formula of the dependent variable other than the dependent variable of the set function formula is determined as being set as the output target.

11. The method according to claim 9, further comprising:
determining whether or not a variable name to which a numerical value data is associated is included in the function formula set as the output target; and
when the variable name is determined as being included, outputting the numerical value data associated to the variable name to the external device together with the function formula set as the output target.

12. The method according to claim 9, further comprising:
storing, in a memory, display range data including an upper limit value and a lower limit value in a horizontal axis direction and a vertical axis direction of a graph image to be displayed on the display;
displaying the graph image on the display in accordance with the display range data stored in the memory; and
outputting data including the display range data stored in the memory to the external device.

13. The method according to claim 9, further comprising:
when the dependent variable other than the dependent variable of the set function formula is determined as being included in the function formula set as the output target, displaying on the display a graph image of a function formula obtained by substituting the function formula of the dependent variable other than the dependent variable of the set function formula into the set function formula.

14. The method according to claim 13, further comprising:
setting a background image file name when displaying the graph image on the display in accordance with a user operation;
displaying a background image indicated by the set background image file name on the display as a background image of the graph image; and
outputting data including the set background image file name to the external device.

15. The method according to claim 13, further comprising:
when formula data set as the output target includes the citation to the list data, displaying on the display the graph image in accordance with the input list data.

16. The method according to claim 13, further comprising:
setting a variable value of a certain variable through a user operation;
when there is a variable of the set variable value in formula data set as an output target by the formula setting, displaying the graph image on the display device according to the set variable value; and
outputting data including data of a variable value set by the variable setting to the external device.

17. A non-transitory computer-readable recording medium having stored thereon a program that when executed by a computer with a display, causes the computer to perform operations comprising:
displaying on the display a function formula of an independent variable in which a first variable is a dependent variable, and a function formula of an independent variable in which a second variable is a dependent variable;
setting a certain function formula as an output target from among the displayed function formulas according to a user operation;
determining whether or not a dependent variable other than the dependent variable of the set function formula is included in the function formula set as the output target;
when a dependent variable other than the dependent variable of the set function formula is included in the function formula set as the output target, outputting a function formula of the dependent variable other than the dependent variable of the set function formula and the function formula set as the output target to an external device by converting the function formula of the dependent variable other than the dependent variable of the set function formula and the function formula set as the output target into a 2D barcode, and displaying and outputting the 2D barcode;
accepting input list data according to a user operation;
determining whether or not a citation to the list data is included in the function formula set as the output target; and
when a citation to the list data is included in the function formula set as the output target, outputting the list data corresponding to the citation and the function formula set as the output target to the external device by converting the list data corresponding to the citation and the function formula set as the output target into a 2D barcode, and displaying and outputting the 2D barcode.

* * * * *